Sept. 30, 1930.  J. W. ANTHONY  1,777,155
FOLDING MACHINE
Filed Dec. 22, 1925   9 Sheets-Sheet 3
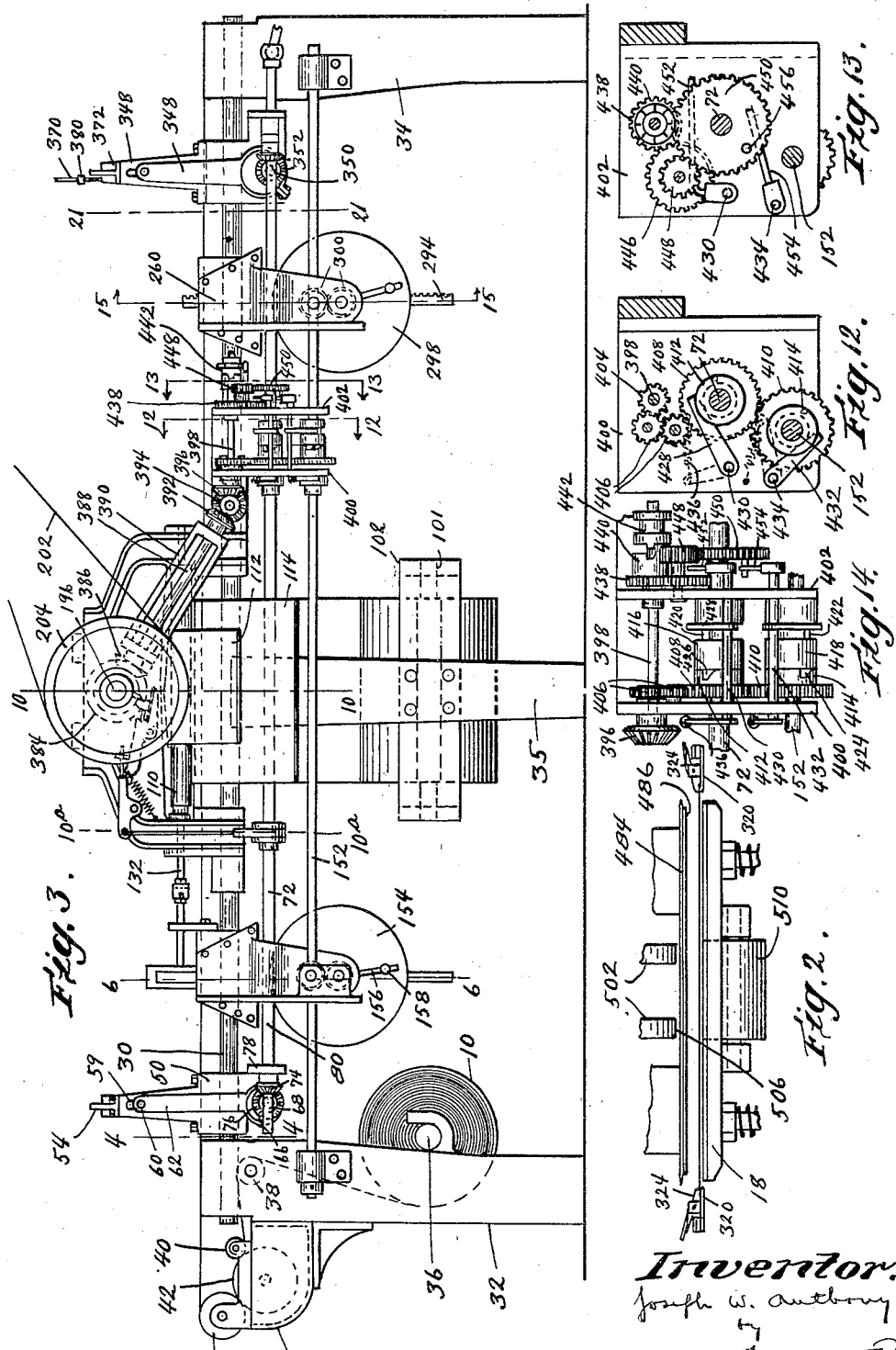
Inventor.
Joseph W. Anthony Sept. 30, 1930.  J. W. ANTHONY  1,777,155
FOLDING MACHINE
Filed Dec. 22, 1925    9 Sheets-Sheet 4
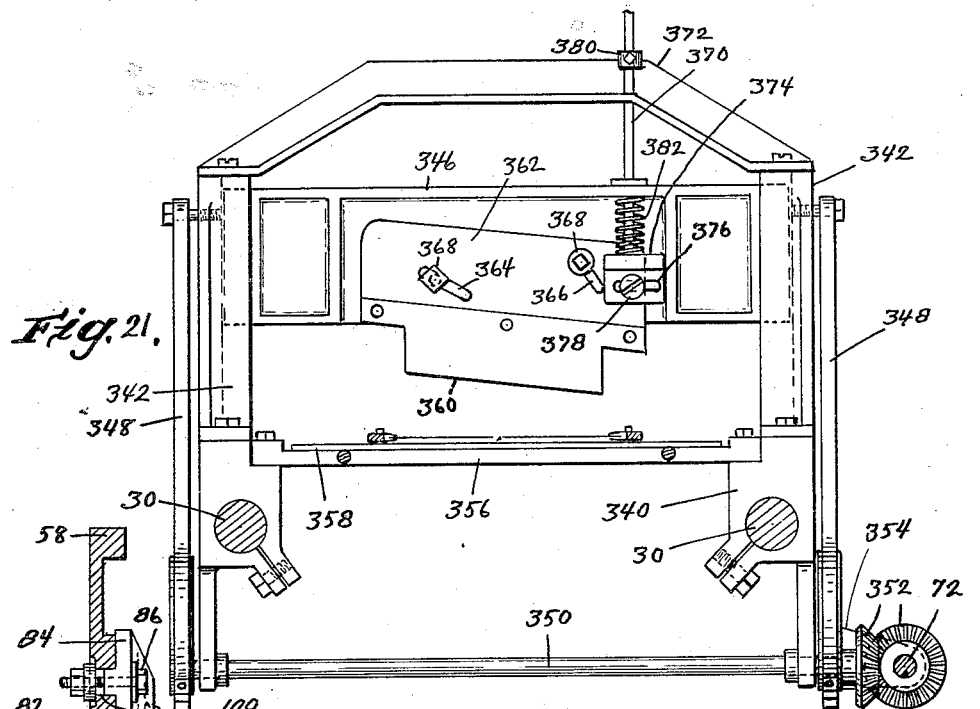
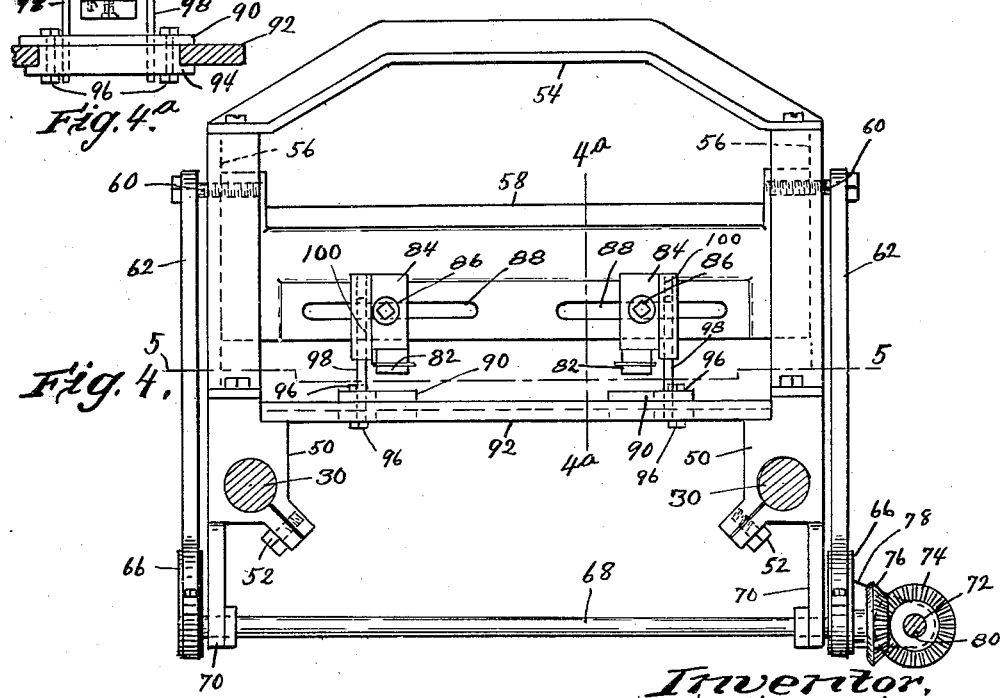

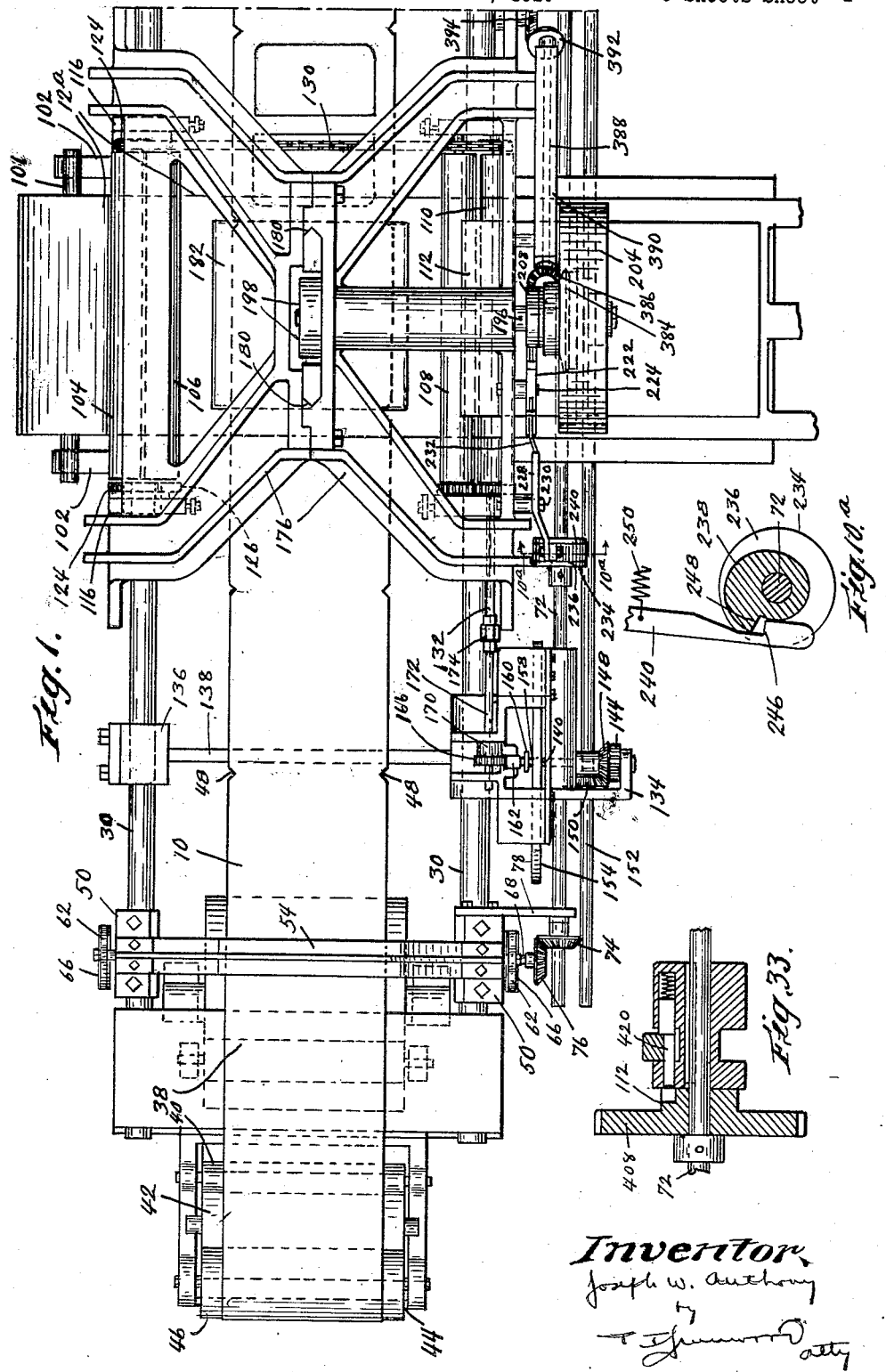

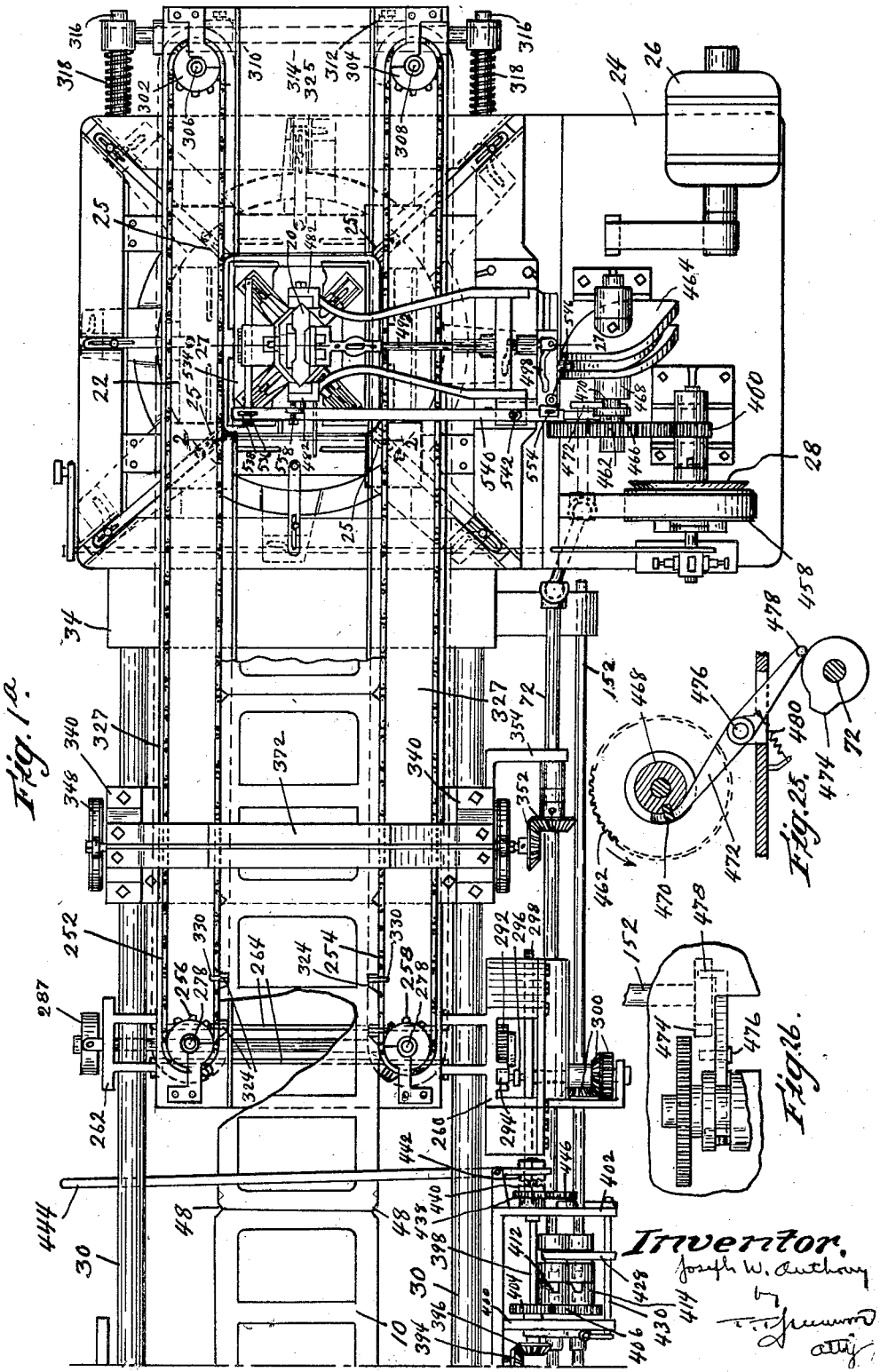

Sept. 30, 1930.  J. W. ANTHONY  1,777,155
FOLDING MACHINE
Filed Dec. 22, 1925   9 Sheets-Sheet 5
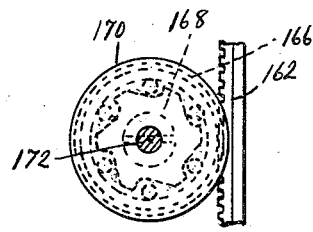
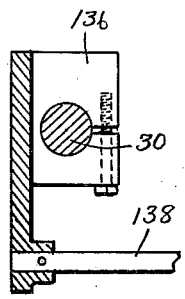
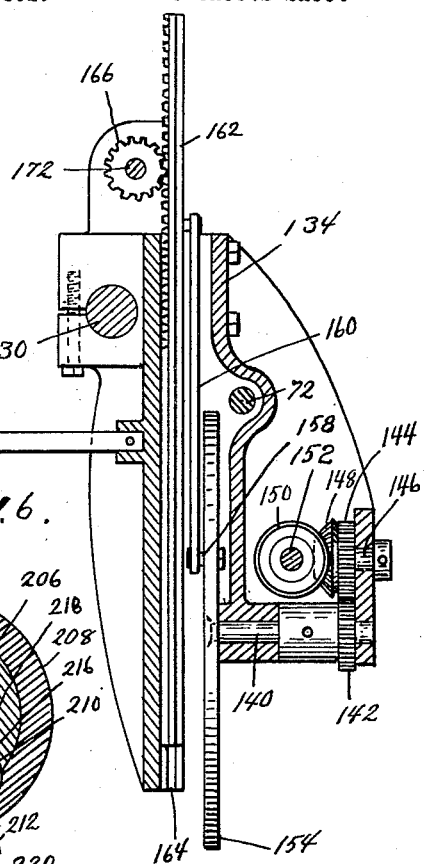
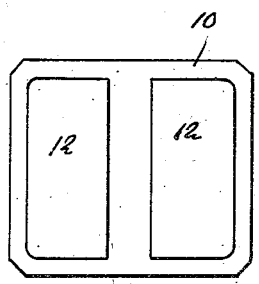
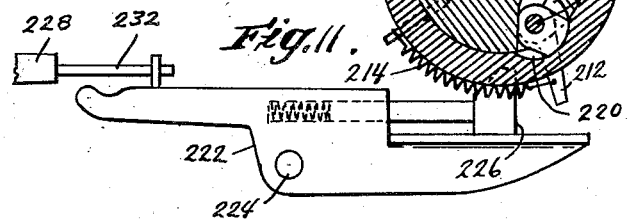
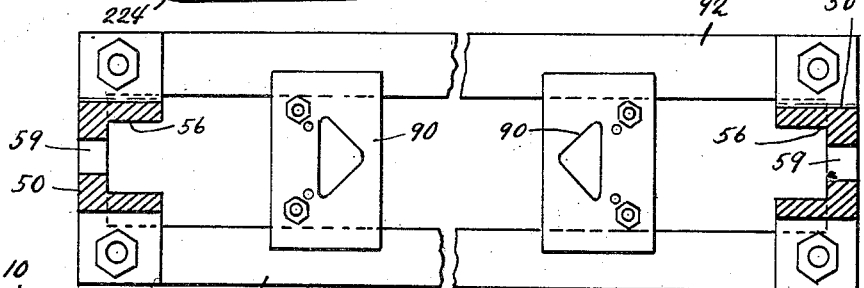
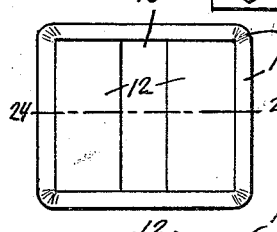
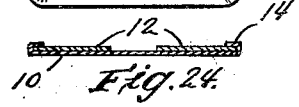
Inventor.
Joseph W. Anthony
by
[signature]
Atty

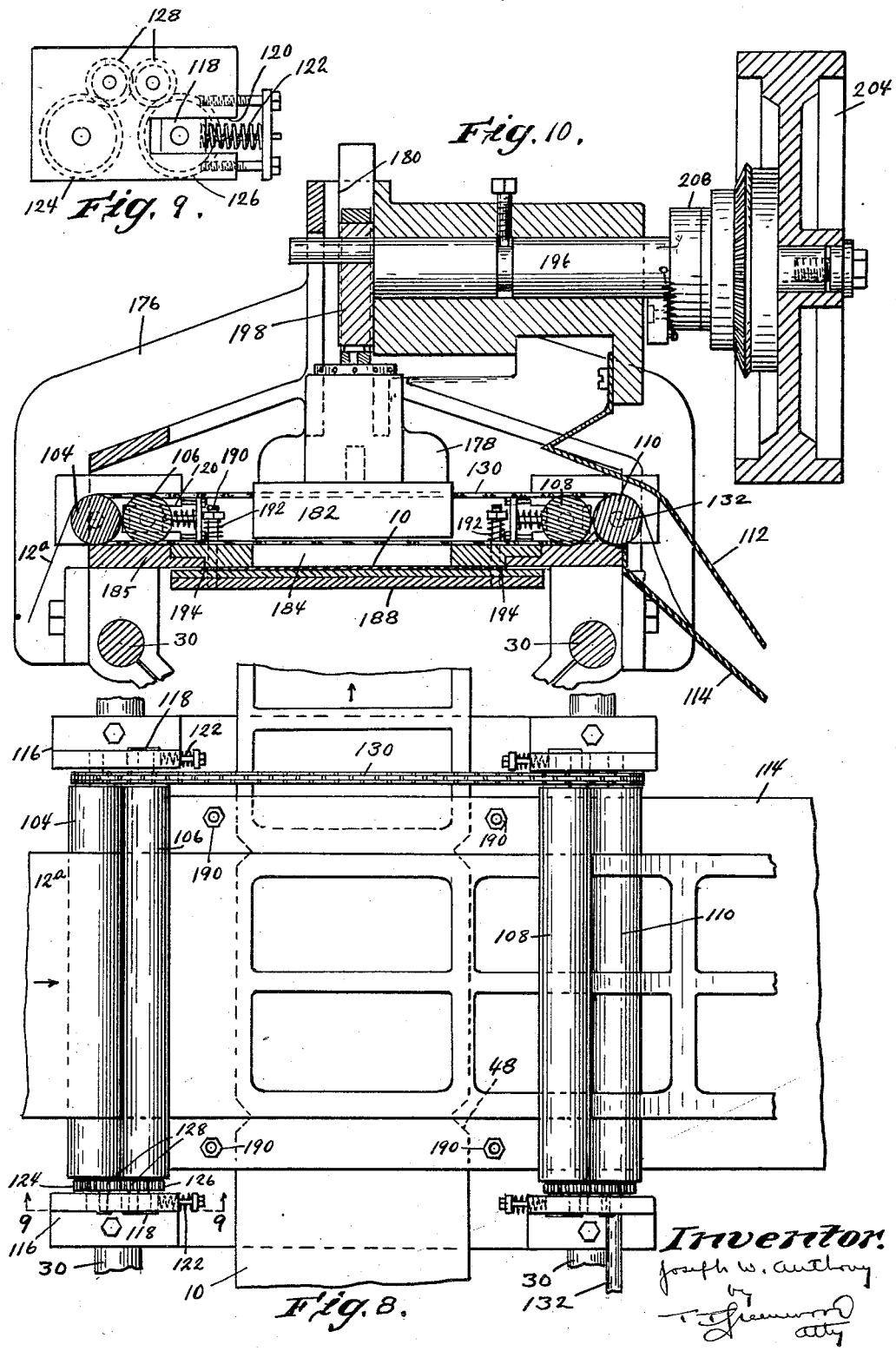

Sept. 30, 1930.  J. W. ANTHONY  1,777,155
FOLDING MACHINE
Filed Dec. 22, 1925  9 Sheets-Sheet 7
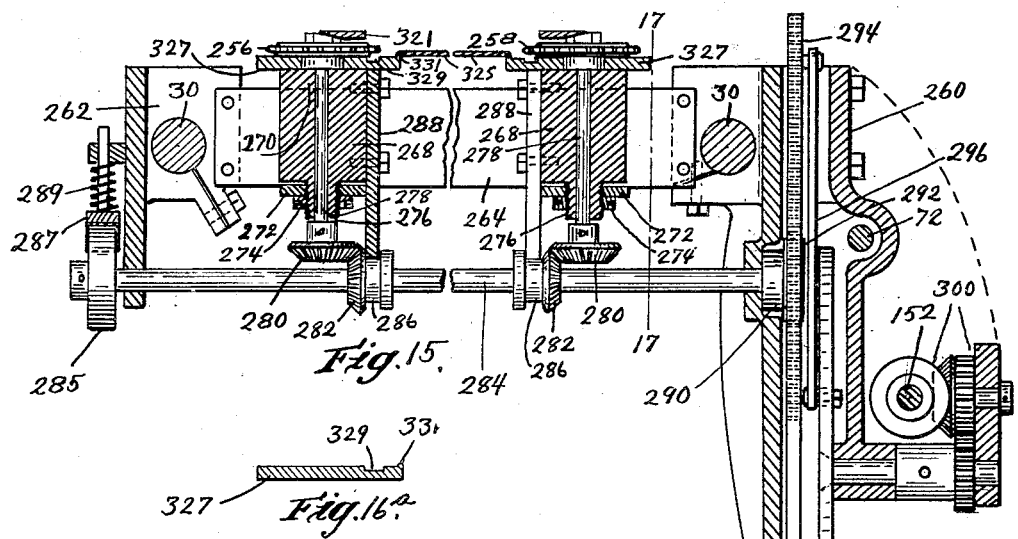
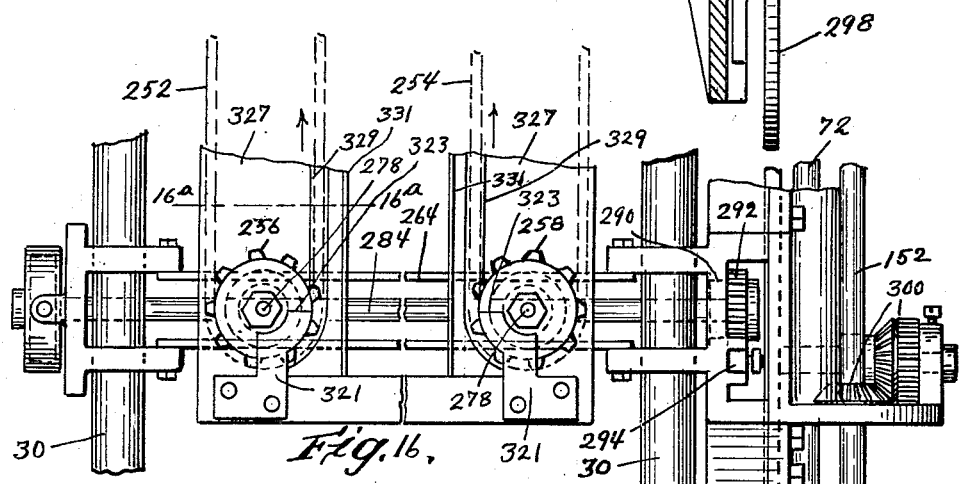
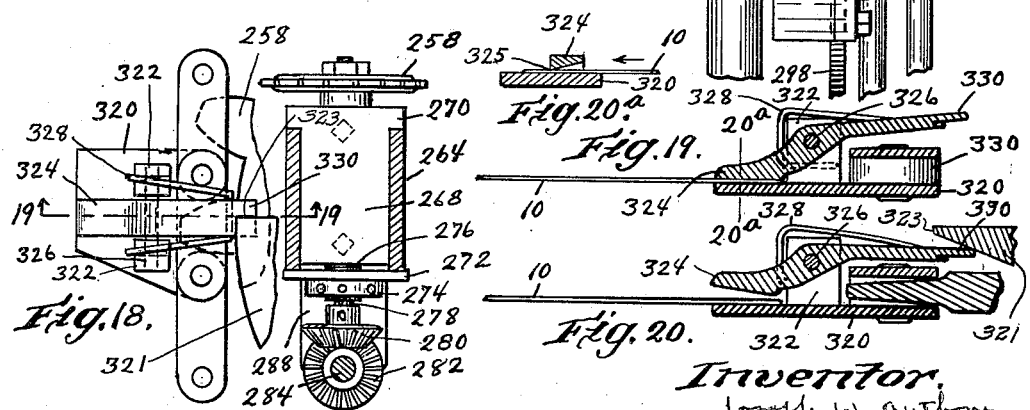

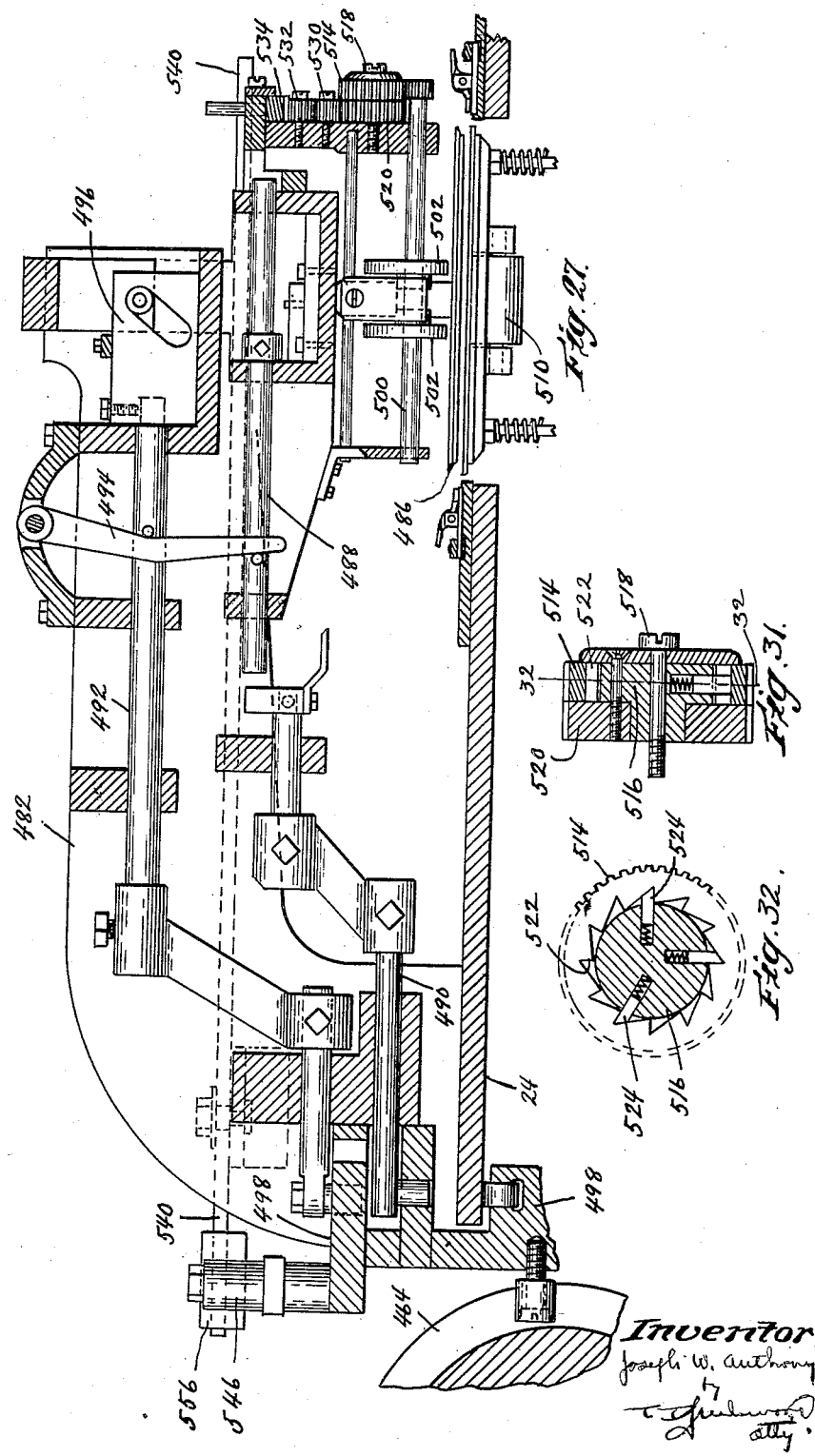

Sept. 30, 1930. J. W. ANTHONY 1,777,155
FOLDING MACHINE
Filed Dec. 22, 1925 9 Sheets-Sheet 9
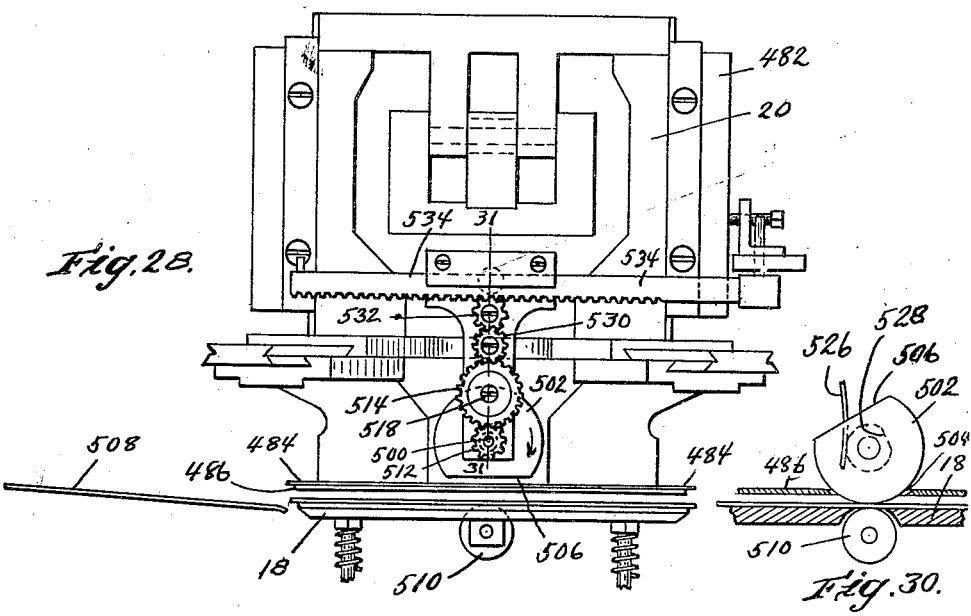
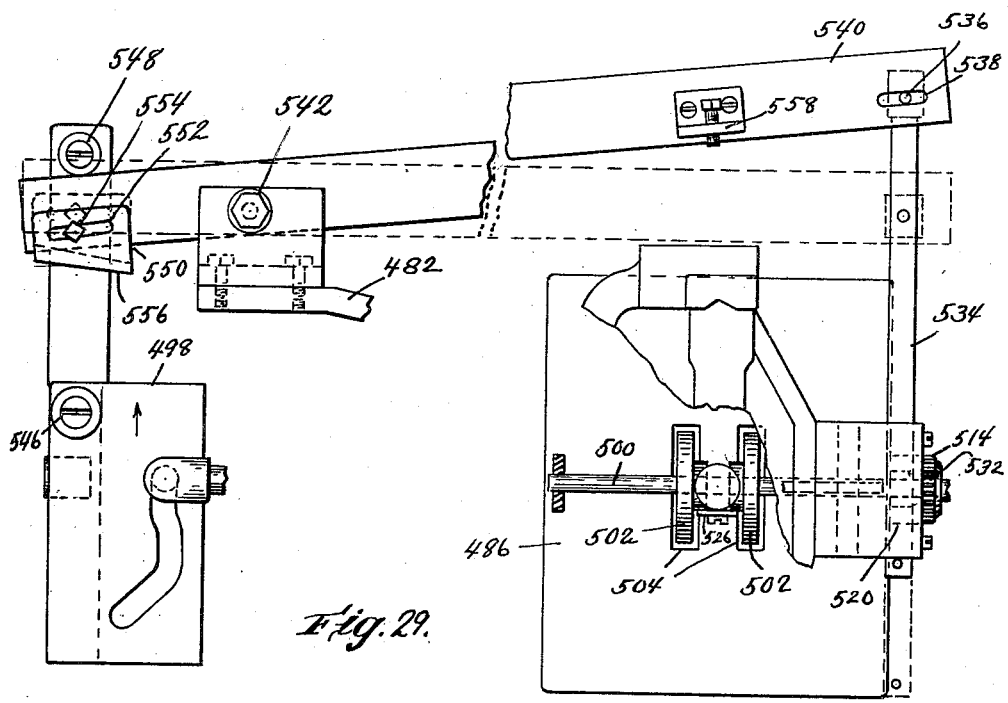
Inventor.
Joseph W. Anthony Patented Sept. 30, 1930

1,777,155

UNITED STATES PATENT OFFICE

JOSEPH W. ANTHONY, OF LYNN, MASSACHUSETTS

FOLDING MACHINE

Application filed December 22, 1925. Serial No. 77,137.

This invention relates to folding machines especially adapted for the making of book covers and has for its main object to provide an automatic folding machine wherein the materials for the book covers are fed into the machine in long strips and are cut into suitable form and are otherwise treated and finally emerge from the machine as complete book covers.

A further object is the provision of means automatically to prepare for folding and to deliver to a folding machine, the materials for book covers and the like.

A further object is generally to improve the construction and operation of folding machines.

Figs. 1 and 1ª represent a plan view of the folding machine embodying the invention.

Fig. 2 is a partial sectional view along line 2—2 of Fig. 1ª and illustrating those elements of the machine which operate upon the material to fold it.

Fig. 3 is a side elevation of that portion of the machine which prepares the material in readiness for folding and delivers it to the folding elements of the machine.

Fig. 4 is a section along line 4—4 of Fig. 3 and illustrating the notching mechanism for the long lengths of cover stock.

Fig. 4ª is a section along line 4ª—4ª of Fig. 4.

Fig. 5 is a plan sectional view taken along line 5—5 of Fig. 4 and illustrating particularly the construction of the female notching dies.

Fig. 6 is a vertical section taken along line 6—6 of Fig. 3 and illustrating particularly the construction of the actuating mechanism for the feed mechanism for the lining material.

Fig. 7 is an enlarged detail of the one way clutch of Fig. 6.

Fig. 8 is a plan detail illustrating the feed mechanism for the lining material.

Fig. 9 is a sectional detail taken along line 9—9 of Fig. 8 and illustrating particularly the manner of supporting and driving the feed rolls.

Fig. 10 is a vertical sectional elevation taken along line 10—10 of Fig. 3 and illustrating particularly the lining blanking mechanism.

Fig. 10ª is a section along line 10ª—10ª of Fig. 3 and illustrating more particularly means to control the timing of the blanking mechanism.

Fig. 11 is a partial sectional detail of the clutch mechanism for the blanking mechanism of Fig. 10.

Fig. 12 is a sectional detail taken along line 12—12 of Fig. 3 and illustrating the arrangement of clutches in the control-gear box of Fig. 3.

Fig. 13 is a view similar to Fig. 12 but taken along line 13—13 of Fig. 3.

Fig. 14 is an enlarged detail of the control-gear box of Fig. 3.

Fig. 15 is a sectional detail taken along line 15—15 of Fig. 3, and illustrating particularly the carrier chain driving mechanism.

Fig. 16 is a plan detail illustrating the mechanism of Fig. 15.

Fig. 16ª is an enlarged sectional detail taken along line 16ª—16ª of Fig. 16.

Fig. 17 is a sectional detail of a chain drive unit taken along line 17—17 of Fig. 15.

Fig. 18 is a plan detail of one of the material gripping and supporting members carried by one of the chains.

Fig. 19 is a sectional elevation taken along line 19—19 of Fig. 18.

Fig. 20 is a view similar to Fig. 19 but illustrating the relative relation between the gripper member and the gripper release member in position.

Fig. 20ª is a section taken along line 20ª—20ª of Fig. 19.

Fig. 21 is a sectional elevation taken along line 21—21 of Fig. 3 and illustrating the severing mechanism.

Fig. 22 is a plan view of the book cover blank as it is delivered into the folding elements for folding.

Fig. 23 is a plan view of the completed or folded book cover.

Fig. 24 is a section of the folded cover taken along line 24—24 of Fig. 23.

Figs. 25 and 26 are side and plan details, respectively, of the clutch mechanism for timing the operation of the folding elements of the machine.

Fig. 27 is an enlarged sectional detail taken along line 27—27 of Fig. 1ª and illustrating particularly the presser head and the means for automatically removing or kicking-out the folded covers from between the folding elements.

Fig. 28 is a front elevation of the presser head, being a more complete elevation than shown in Fig. 2, and illustrating particularly the mechanism for operating the kick-out rolls.

Fig. 29 is a plan detail of the kick-out mechanism, many of the parts being broken away.

Fig. 30 is a side view of a kick-out roll in a partially operated position.

Fig. 31 is a sectional elevation along line 31—31 of Fig. 28 and illustrating particularly the one-way clutch mechanism connecting the kick-out rolls with the operating mechanism therefor.

Fig. 32 is a section along line 32—32 of Fig. 31.

Fig. 33 is a sectional detail of one of the clutch mechanisms used in the gear-box of Fig. 3.

The book cover made by the folding machine embodying this invention comprises an outer sheet 10 of cover material which usually is flexible and may be composed of leather, or artificial leather, or any suitable material manufactured in long strips or in rolls.

Ordinarily the cover is provided with two strips 12 of some lining material which imparts increased stiffness, although it may not necessarily destroy the flexibility of the cover. The two strips of lining material usually are spaced apart on the cover as shown in Figs. 23 and 24 whereby to provide an unlined middle portion adapted to form the back of the book. The lining material is usually, although not necessarily, composed of paper stock, as thin and flexible paper, which also is manufactured in long sheets or in rolls. The cover sheet 10 is reflexed about the borders thereof, as at 14, and is folded upon the lining strips 12. Preferably the machine is so arranged as to form the round corners 16. The cover sheet and the linings are adhesively affixed together; and the reflexed edge 14 is also adhesively affixed to the lining. The cover stock is delivered to the folding elements of the machine in the form illustrated in Fig. 22 and is folded into the form illustrated in Fig. 23.

The book covers are manufactured in a plurality of different sizes and the folding machine embodying this invention is adapted for adjustment whereby to provide for the manufacture of different sizes of covers. The folding elements of the machine are illustrated at the right hand end of Fig. 1ª and may be constructed essentially as disclosed in my Patent No. 1,477,745, issued December 18, 1923.

The essential folding elements of the machine include a yieldingly supported table 18, see Fig. 2, above which the blanks prepared as illustrated in Fig. 22 are disposed for the folding operation. A presser head 20 is disposed above said table and is adapted to press the blank downwardly onto the table and strip it from grippers hereinafter to be described and hold it upon said table while side wipers 22, see Fig. 1ª, and corner wipers 25, are moved inwardly to effect the folding over of the edge of the cover material 10. The wipers are then withdrawn and the presser head is raised above the table and the folded book cover is removed automatically whereby to permit the automatic insertion of a new blank between the presser head and the table.

The various folding elements of the machine are supported on a horizontal bed 24 and driven by suitable means as an electric-motor 26 through suitable clutch control mechanism 28, the elements of the clutch being shown disengaged to illustrate the construction. Preferably the cover material and the lining material are in large rolls from which strips or sheets are drawn and fed towards the folding elements and operated upon to form the cover blank illustrated in Fig. 22. The various process steps are performed as follows: first, coating the cover strip with a cement or adhesive; second, notching the opposite marginal edges of the cover strip at the subsequent line of severance; third, moving the lining material in a position above the cemented and notched cover strip; fourth, blanking the lining sheets from the lining strip and depositing them upon the cemented cover strip; fifth, feeding the cover strip with the attached lining blanks thereon into a conveying mechanism; sixth, severing the cover strip into cover blanks; seventh, feeding the blanks into the folding elements; eighth, folding the blank; ninth, removing the completed covers from the machine.

The various machine elements are disposed in spaced alignment and are adapted to operate progressively upon the cover material and are supported upon a frame work comprising a pair of spaced horizontal guide rods 30, the ends of which rods are fixed in the upper ends of supporting legs 32 and 34 and legs 35 may be connected to, and support, the middle portion of said guide rods. The frame thus described is disposed along side and is a continuation of the bed 24 and the longitudinal axis of the frame is in alignment with the longitudinal axis through the folding elements. The majority of the various mechanisms are supported upon said guide rods 30 for longitudinal adjustment therealong whereby to condition the machine for the preparation and folding of covers of various lengths; and many of said mechanisms are transversely adjustable on said rods whereby to govern the dimensions of the covers.

The cover material 10 is supported on a roll 36 which is carried loosely by the legs 32 of the frame. The cover strip 10 is threaded over a supporting roller 38 and thence under a guide roll 40 and over a pasting roll 42 which roll is partially immersed in a trough 44 which is adapted to contain a suitable adhesive. The pasted strip thence passes upwardly about a roll 46 and thence horizontally over the frame of the machine. Said rolls 40 and 46 are so arranged that they support the strip 10 in contact with the pasting roll 42 for a substantial arc of contact therewith and deliver the pasted strip to the various components of the machine with the pasted side of the strip uppermost.

The pasted strip is first presented to the action of a notching mechanism which operates to cut opposed notches 48 in the opposite marginal edges of the strip and at predetermined distances therealong as illustrated in Fig. 1. The strip 10 is subsequently passed through gripping and conveying mechanism which grips the marginal portions of the strip and carries it through a severing mechanism and one purpose of the notches 48 is to permit the severing cutter to enter between the gripping and conveying mechanism and sever the strip entirely across between the notches.

The notching mechanism is disposed on the guide rods 30 adjacent the pasting mechanism. Said notching mechanism includes a pair of vertical standards 50 slidably received on and extended vertically above the guide rods 30. Said standards are adapted to be secured releasingly in any predetermined position on said guide rods by suitable means as the clamping screws 52 and may be slid along said guide rods for the purpose of varying the lengths of the cover blanks. The upper ends of said standards 50 are connected rigidly together by a cross bar 54. Said standards 50 are formed with vertically disposed guide ways 56 therein in which a cross-head 58 is slidably received and slots 59 extend vertically through said standards and are adapted to receive pins 60 which are screw-threaded in the upper end of said cross head and extend outwardly therebeyond. Said cross head is reciprocated by means including a pair of eccentric straps 62 which are disposed adjacent the outer faces of said standards and are pivoted on said pin 60 at their upper end. The lower end of said eccentric straps are received on eccentrics 66 which are fixed to a cross shaft 68 journalled in depending ears 70 of said standards below said guide rods 30. Said cross shaft 68 is driven from a drive shaft 72 through a pair of bevel gears 74 and 76. An arm 78 is extended outwardly from one of said standards 50 in position to engage the hub of said gear 74 and maintain it constantly in mesh with the gear 76 while the frame of the notching mechanism is moved along said guide rods 30 into a new position thereon. Said gear 74 is provided with a splined connection 80 with said drive shaft 72 whereby to permit such movement while maintaining the driving connection with said shaft.

The cross head 58 is provided with a pair of male notching dies 82 which are more or less triangular in form. Said dies are secured to the lower end of the supporting blocks 84, which blocks are secured to the lower portion of the cross-head by suitable means as clamping bolts 86. Said blocks are adjustable toward and away from each other on the cross-head by means including the horizontally-disposed slots 88 in said cross-head through which said bolts 86 pass. The female die members 90 are supported upon a pair of spaced cross-bars 92 and are secured adjustably in position on said cross-bars by clamping plates 94 disposed beneath the die members in position to engage with the lower faces of said cross-bars. Bolts 96 pass through said die members and clamping plates, see Fig. 4ª, to secure said die members in the aforesaid relation. Guide pins 98 are secured in said die members 90 and are extended vertically thereabove and are slidably received in vertical slots 100 of the upper die block holders 84 whereby the male and female die members are maintained in alignment during re-adjustments thereof.

The strip 10 of cover material is adapted to pass between said upper and lower die members and between said pins 98 and said die members are adapted to form notches 48 in the opposed margins of the strip. The strip 10 is moved longitudinally through the machine after each operation of the notching mechanism so that the notches in the strip 10 are spaced apart as illustrated in Fig. 1.

The notched cover strip is arranged to pass from the notching mechanism to a lining blanking mechanism which operates to cut the lining blanks 12 shown in Fig. 22 from a long strip or roll of lining material and deposit the blanks in proper position upon the pasted surface of the cover strip 10. The lining material is in the form of a long strip 12ª which is supported in roll form on a shaft 101. Said shaft is rotatably supported removably in a bracket 102 attached to the middle legs 35 of the frame. The strip 12ª of lining material passes upwardly and transversely over the frame of the machine and the cover strip 10. The lining strip 12ª passes over a roll 104 and downwardly about a cooperating roll 106 and thence transversely above the cover strip 10 and upwardly about a roll 108 and a cooperating roll 110 and thence through upper and lower guide members 112 and 114 respectively to waste.

The pairs of rolls 104, 106, 108, 110 constitute driving means for the lining strip 12ª and also means to maintain the strip under tension between the dies of the blanking mechanism herein to be described. The roll 104 is journalled in bearing blocks 116. The roll 106 is journalled in blocks 118 which are slidable in slots 120 of said bearing blocks 116. Compression springs 122 bear against said blocks 118 whereby to urge said roll 106 toward the roll 104 and thereby to bear yieldingly and with substantial pressure upon the lining strip 12ª and to place said strip under suitable tension. The corresponding rolls 108 and 110 are supported in a similar manner. The rolls 104 and 106 are provided with gears 124 and 126 respectively, which are connected through intermeshing idler gears 128 for the purpose of driving said rolls in opposite directions. The rolls 108 and 110 are provided with similar gears. The pitch diameters of said gears 124 and 126 may preferably be slightly less than the diameter of said rolls whereby to cause a tension to be exerted upon the lining strip between the two sets of rolls and thereby to maintain the strip taut between the sets of rolls. The two sets of rolls are connected for conjoint rotation by means of a chain 130 which passes over sprockets carried by the rolls 104 and 110 respectively. The sets of rolls are driven through the driving shaft 132 of the roll 110 which shaft is extended outwardly beyond one of the bearings of the roll for this purpose.

The driving mechanism for the above rolls is arranged to operate them in an intermittent manner, but always in the same direction so that new sections of lining strip are moved into position above the cover strip 10 in a step by step manner and in timed relation with the movements of other parts of the machine. The driving mechanism for said roll is illustrated more particularly in Figs. 1, 3 and 6 and includes a bracket 134 which is carried adjustably on one of the guide rods 30 of the machine. A guide block 136 is secured adjustably on the other guide rod 30 and is rigidly connected to said bracket 134 by a suitable means as the cross bar 138. A horizontal shaft 140 is journalled in the lower portion of said bracket 134 and is provided with a gear 142. Said gear is in constant mesh with a gear 144 which is journalled on a stud shaft 146. A bevel gear 148 is fixed to said spur gear 144; and said bevel gear 148 is in mesh with a bevel gear 150 fixed to the drive shaft 152. A disc 154 is fixed to the end of said shaft 140. Said disc has a radial slot 156 therein in which a stud shaft 158 is adjustably received; and the lower end of the connecting rod 160 is pivoted on said shaft. It is obvious that by varying the position in said stud shaft 158 in said slot, the throw of said connecting rod may be varied. The upper end of said connecting rod 160 is pivotally connected with a vertical rack 162, which rack is slidable in vertical ways of said bracket. Said rack is in constant mesh with a gear 166 which is fixed to the hub 168, see Fig. 7, which hub cooperates with the drum 170 of a one-way clutch mechanism fixed to a driving shaft 172 and said driving shaft is connected preferably through a universal joint 174 with the driving shaft 132 of said roll 110. Said one way clutch mechanism may be of any usual or suitable construction that provides for rotation of said shaft 172, and, consequently, the rolls, during the movement of said rack 162 in one direction while permitting movement of the rack in the other direction without actuating said rolls, thereby imparting a progressive step by step feeding of the lining strip 12ª. The mechanism above set forth provides means whereby the length of lining strip fed during each feeding movement can be varied, for various sizes of book covers, by varying the stroke of the rack.

The lining blanking mechanism comprises a frame 176 which is disposed above the lining feeding rolls and is supported upon the guide rods 30. Said mechanism includes a die-supporting head 178 which is vertically movable in ways 180 of the frame and is adapted to carry, at its lower end, a pair of male dies 182, which dies are adapted to blank out of the lining strip 12ª, at each stroke thereof, a pair of blanks 12 as illustrated in Fig. 24. A female die 184 is disposed below the male dies and directly beneath the tensioned portion of the lining strip 12ª, which is extended between the driving and tension rolls. Said female die is removably secured in position to the frame-plate 185 by any suitable means, not necessarily indicated. The blanking mechanism is adapted to receive various sizes of male and female dies, for the making of various sizes of book covers. The cover strip 10 is adapted to pass directly beneath the female die. A table 188 is disposed beneath said female die and the cover strip 10 and is yieldingly supported in position by suitable means as bolts 190 which are fixed in said table and are slidably extended vertically through slots in the frame-plate 185 and are provided with encircling springs 192 at their upper ends. Preferably said table 188 is maintained in sufficiently spaced relation beneath the female die to permit the free passage of the cover strip 10 therebetween and the means for maintaining the table in such relation may comprise spacer washers 194 disposed upon said bolts 190 between said table and said female die. A thus arranged each downward movement of the die head 178 serves to cut out of the strip 12ª of lining material a pair of lining blanks and carry them through the female die and press them upon the pasted surface of the cover strip 10, to which said blanks will adhere.

The die head 178 may be reciprocated by the actuating shaft 196 through any suitable mechanism 198 common to punch presses. The blanking mechanism may be driven in any suitable manner as by a belt 202 which passes over a flywheel 204 loosely journalled on an extension of the actuating shaft 196 of said blanking mechanism. Clutch mechanism is provided whereby to connect said fly wheel positively with the actuating shaft whereby to effect a single operation of the die head 178. Said clutch mechanism may be of more or less common construction and may comprise a hub 206, see Fig. 11, fixed to said actuating shaft and a sleeve 208 which is fixed to said fly wheel 204 and encircles said hub. A clutch shaft 210 is journalled in said hub and is extended outwardly therethrough and is provided with an arm 212 on its outer end which is urged constantly in a clockwise direction, see Fig. 11, by a tension spring 214.

Said hub 206 is formed with a recess 216 therein in which a cam member 218 is disposed. Said cam member is fixed to a shaft 210 journalled in said hub. The bushing 208 is formed with an internal recess 220 into which said cam member 218 is adapted to be moved when said recess is in alignment with recess 216 in the hub. When the cam member and the hub and bushing are in the respective positions illustrated in Fig. 11, the fly wheel and shaft are in driving engagement and consequently both will rotate together.

Means are provided for removing said cam 218 from driving connection with said bushing under conditions to permit the blanking mechanism to make one complete operation at a time. Said means includes an arm 222 which is pivotally supported at 224 below said hub and bushing. Said arm carries a yieldingly supported abutment member 226 which, when the arm is maintained in the position shown in Fig. 11, is disposed in the path of movement of said arm 212 and serves to withdraw the cam from its driving connection with the bushing 208, consequently permitting the fly wheel to run idle. When said arm 222 is actuated to lower the abutment from the aforesaid position, the spring 214 serves to effect the driving connection between the bushing and hub. The arm 222 is raised and lowered by means of a lever 228, see Fig. 3, which lever is pivoted intermediate its ends, at 230, to the frame of the blanking mechanism. Said lever has an extension 232 which is in loose engagement with the arm 222. Said lever is raised and lowered by the upper shaft 72. For this purpose, said shaft is provided with a drum 234, see Fig. 10ª, which has a peripheral groove 236 therein and the bottom of said groove is given the cam formation 238. A depending link 240 is pivoted to said lever 228 and the lower end of said link is provided with a head 242 which is disposed loosely within the groove 236 of said drum 234. Said head is formed or provided with a shoulder 246 which is adapted to engage a corresponding projection 248 of the cam portion 238 of said drum. The arrangement is such that each rotation of the drum serves to pull down and thereafter release said shaft, whereby each rotation of said shaft 72 serves to effect one blanking operation of the blanking mechanism. A spring 250 may be connected with said link 240 and serve to urge said head toward the cam surface of said drum.

The cover strip 10 upon which the lining blank has been adhesively secured, is arranged to pass from the blanking mechanism to a conveying mechanism in which the marginal edges of the cover strip are gripped and supported before and also after being severed into separate cover blanks.

The conveying mechanism includes a pair of endless chains 252 and 254 which are disposed adjacent the opposite marginal edges of the cover strip 10 and between which the cover strip is adapted to be disposed and supported. The passes of said chains are disposed in horizontal plane which includes the plane of the cover strip. The forward loops of said chains are passed over horizontally disposed sprockets 256 and 258 which sprockets are rotatably supported on a frame carried by the guide rods 30. Said frame includes a bracket 260 secured to one of said guide rods and a block 262 secured to said other guide rod. Said bracket and block are secured rigidly together by means including a pair of spaced bars 264. The chain sprockets are supported on said frame by sprocket carriers 268 which are disposed between said bars 264 and are provided with enlarged heads 270, Fig. 17, which extend over the upper faces of said bars. Said carriers are slidable along said bars whereby to move said chains towards and away from each other to condition said chains to grip cover strips of varying widths. Said carriers may be secured in adjusted positions on said bars by means of the clamping plates 272 disposed beneath said bars and the clamping rings 274, which rings are screw-threaded on reduced and screw-threaded extensions 276 of said carriers and are adapted to lock said carriers in adjusted position on said bars.

A shaft 278 is journalled vertically in each carrier and a sprocket wheel is fixed to the upper end of each shaft. The lower end of each shaft is provided with a bevel gear 280 which is in mesh with a driving bevel gear 282. Said driving bevel gear is in sliding driving connection with a transversely disposed driving shaft 284. Said gears 282 are formed or provided with peripheral grooves 286 therein in which yoke members 288, carried by and depending below the sprocket, are loosely received. Said yokes provide means whereby the driving connection between said gears 280 and 282 may be maintained while moving the sprocket wheel carriers along said supporting bars 264 into new adjusted positions thereof.

Said chains are adapted to be moved along in a step by step manner in one direction by a suitable mechanism which includes a one way clutch 290 and a pinion gear 292 associated with the clutch. Said one way clutch may be similar to the one illustrated in Fig. 7 and need not be further described. A vertically-disposed rack 294 is guided for vertical movement in the bracket 260 and is disposed in mesh with said pinion gear 292. Said rack is reciprocated by means of a connecting rod 296 which has an adjustable connection with a driving disc 298 supported in said bracket 260. Said disc is driven through gears 300 from the lower drive shaft 152. The construction of the driving mechanism above described is similar to that described in connection with the driving mechanism for the lining strip, as illustrated in Fig. 6, and need not be more specifically described.

If found necessary, means may be provided to absorb the momentum of the chains and the associated mechanism whereby to stop the cover blanks in proper position with relation to the folding elements and prevent the overrunning of said blanks; and said means may include a brake drum 285 fixed to said shaft 284 and a brake shoe 287 which is pressed into yieldingly frictional engagement with said brake shoe by means including a spring 289.

Said chains are extended over the body 24 which supports the folding elements of the machine and passes on opposite sides of the folding elements in such a manner as to move the cover blanks into position above the table 18 and under the presser head 20. The rear loops of said chains pass about the sprocket wheels 302 and 304. Said sprocket wheels are fixed to shafts 306 and 308 which shafts are rotatably supported vertically in carriers 310 and 312. Said carriers are mounted on a cross member 314 and are adjustable along the length thereof for the purpose above set forth. The ends of said cross member 314 are preferably slidably received on guide pins 316 which extend horizontally outward from and are secured to the bed 24. Springs 318 are disposed on said pins 316 and bear against said cross member 314 whereby to maintain said chains under tension.

Said chains are provided with a plurality of gripping elements which are adapted to engage the opposite marginal edges of the cover strip 10, and the blanks severed from the strip, and convey the strip forward and move the blanks into position between the folding elements of the machine. Each gripping means comprises a plate 320 which is adapted to be substituted for the usual lower link of the chain and is pivoted in the usual manner to adjacent links. Said plate 320 extends forwardly beyond the body of the chain as illustrated in Fig. 18 and its extended portion is formed or provided with spaced upstanding lugs 322. A gripper jaw 324 is disposed between said lugs and is pivoted on a pin 326 inserted through said lugs. A loop spring 328 has its ends fixed in said lugs and has its intermediate portion disposed beneath a rearwardly directed extension 330 of said jaw in a position to urge it toward said plate 320. The cover strip 10 is adapted to be received between said plate and said gripper jaw. The lower face of the gripper jaw preferably is formed with the gripping edge 325 and is otherwise relieved, as illustrated in Fig. 20$^a$. This arrangement is such that the grip on the cover material is enhanced in the direction of movement of the material, yet the material can readily be stripped from the grippers at the first part of the folding operation.

Normally said gripper jaw is urged by its spring toward the plate 320. Means are provided to raise said jaw as it passes about the forward sprocket wheel, whereby to open the gripper and permit it to be moved over the margin of the cover material, and thereafter to release the jaw, whereby to cause it to press against the material. Said means includes a plate 321 which is disposed above the forward sprocket wheel in a position to be engaged by the gripper jaws as they pass about the sprocket. Said plate is provided with a lower cam face over and in contact with which the jaws are moved; and said cam face serves to open the jaws so that the cover material can enter therebetween. The release-edge 323 of said plate is disposed slightly in the rear of the plane including said forward sprockets and the gripper jaws are adapted to close upon the cover material automatically as they pass beyond said edge. This arrangement and disposition of the gripper-jaw control is such that the jaws are opened and closed without causing the twisting of the grippers and thereby prevents an improper gripping action.

It is found in practice that, for certain kinds and sizes of book covers, two chains are not necessary and that the cover material, and the severed blanks, can be moved along toward the folding elements without any material amount of twisting, when carried by the grippers of one chain only. Under such circumstances, the other chain is not needed and, if the machine is utilized mainly for such class of work, one of the chains may be removed. When the material is moved forwardly by one chain alone, the unsupported portion of the material is adapted to rest upon and be moved over one or more plates 325ª (Fig. 15) disposed between the chains and approximately in line with the grippers of the chains and extended lengthwise approximately to the bed of the folding elements.

Means are provided to support the chains against sagging between the sprockets and also to support them against whipping. Said means comprises plates 327 which are disposed immediately beneath the chains and are extended between the sprockets and are secured to the carrier blocks for the sprocket wheels. Said plates are formed with grooves 329 in their upper faces in which the lower faces of the chains are received. The inner edges of said plates are formed with upstanding ribs 331 which project in front of the front faces of the gripper plates and thereby prevent lateral movement of the inner reaches of the chains. Such movement of the outer reaches of the chains is of little consequence and so the outer grooves in said plates may lack such ribs.

The carrier mechanism above set forth serves to move the notched cover strip 10 with the lining blanks 12 cemented thereon to a severing mechanism which is disposed between the blanking mechanism and the folding mechanism. The severing mechanism is generally the same in construction as the notching mechanism previously described and includes a frame 340 which is slidably mounted on the guide rods 30 and can be secured thereto in any suitable position therealong whereby to sever the cover strip into blanks of varying lengths. The frame 340 includes opposed vertical standards 342 in which a cross-head 346 is slidable. The cross-head is adapted to be reciprocated by eccentric straps 348 connected with a shaft 350, which shaft is driven through gears 352 from the upper drive shaft 72. The drive shaft gear has a spline connection with the drive shaft and is arranged in the manner set forth above so that the frame of the severing mechanism may be moved along the guide rods while maintaining the driving engagement of said gears 352.

The frame is provided with a cross bar 356 which is disposed immediately beneath the carrier chain; and a stationary knife 358 is secured removably to the upper face of said cross bar. The cross head 346 is provided with a movable knife 360 which is carried by a knife support 362. Said knives cooperate, in a downward movement of a crosshead 346, to shear or sever the cover strip 10 into blanks. Each movement of the carrier chains is adapted to move the cover strip 10 the length of a cover blank and into such position that the marginal notches in said cover strip are between the knives. The inner ends of said notches are adapted to lie beyond the line of the grippers of the carrier chain so that the knives of the severing mechanism can sever the blanks completely from the strip.

The upper knife 360 of the severing mechanism is lower at one end than at the other as is illustrated in Fig. 21 so that a shearing action is effected; and means are provided to render the shearing effect more pronounced as the knife is moved downwardly. To this end the knife support 362 is formed or provided with a pair of slots 364 and 366 respectively which are inclined in different directions in the support; and guide bolts 368 are extended through said slots and are removably screw-threaded in the cross head 346. A rod 370 is extended slidably through the top frame member 372 of the severing frame and also slidably through an aperture in the cross head 346. A block 374 is fixed to the lower end of said rod and said block has a loose connection with the knife support 362 by means of the horizontal slot 376 in said block and a screw 378, which screw is loosely received in said slot, and is fixed in said knife support. A collar 380 is adjustably secured to the upper end of said rod 370 above the top frame member 372. A spring 382 encircles said rod and bears against the cross head and the block 374 of said rod, whereby to support the knife support and the knife yieldingly in the position illustrated in Fig. 21. The arrangement is such that, as the cross head, with its knife, is moved downwardly into contact with the cover strip, the collar 380 moves downwardly and against the upper frame member and thereby prevents one end of the knife support from further downward movement. A continued downward movement of the cross head, however, causes the knife support and its knife to rock on the pins 368 and thereby effect a slicing or shearing movement of the knife which more effectively severs the blanks from the strip.

All of the elements above described, with the exception of the folding elements, are here shown as driven from the blanking mechanism. To this end the fly wheel 204 of the blanking mechanism is provided with a gear 384 which rotates with the fly wheel. Said gear is in mesh with a second gear 386 which is fixed to the upper end of a shaft 388, which is suitably supported in a frame 390. The lower end of said shaft is provided with a bevel gear 392 which is in mesh with an idler bevel gear 394 and said idler gear is in mesh with a bevel gear 396 which is fixed to one end of a shaft 398 of a timing mechanism by which the operation of the various mechanisms above described are carried out in proper sequence.

The timing mechanism includes a frame having a pair of spaced plates 400 and 402 in which said shaft 398 is journalled. Said upper and lower driving shafts 72 and 152 respectively are also extended through said plates and are rotatably supported therein. Said shaft 398 has a gear 404 fixed thereto, see Fig. 12, and said gear 404 is in driving relation, through suitable idler gears 406, with a gear 408 which is loosely mounted on the upper drive shaft 72. Said gear 408 is in mesh with a pinion gear 410 which is loosely mounted on the lower drive shaft 152. Said gears 408 and 410 are fixed to driving elements 412 and 414 respectively of clutch mechanisms, the driven elements of which 416 and 418 respectively are fixed to said respective shafts 72 and 152 for conjoint rotation therewith. The clutch mechanism may be of any suitable type and, as here shown, includes pins 420 and 422 which are slidable in the driven clutch elements 416 and 418 respectively and are adapted to engage notches 424 and 426 respectively in the driving elements 412 and 414 of the clutch mechanism, see Fig. 14. Said pin 420 is controlled by an arm 428 which is fixed to a cross rod 430 journalled in the plates 400 and 402. The clutch pin 422 is controlled by a similar arm 432 which is fixed to similar cross rod 434. Tensile springs 436 are associated with said cross rods to maintain the arms yieldingly in the relative position shown in Fig. 12. The timing mechanism includes a gear 438, see Figs. 3 and 13, which gear is fixed to a driven clutch element 440 which is loose on the shaft 398. Said driven clutch element cooperates with a driving clutch element 442 which is fixed to said shaft 398. The driving connection between said clutch members is under the control of a lever 444, see Fig. 1ª, by which the entire mechanism may be started or stopped.

Said gear 438 is in mesh with an idler gear 446 which is fixed to a smaller gear 448. Said gear 448 is in constant mesh with a timing gear 450. The clutch control rods 430 and 434 are provided with arms 452 and 454 respectively which lie over one face of said timing gear 450 and said timing gear is provided with an outstanding pin 456 which is adapted alternately to engage and depress and subsequently release said arms. The arrangement is such that the depression of each arm serves to cause each of said shafts 72 and 152 to be driven through one complete revolution whereby to actuate the mechanisms connected with said respective shafts. The arrangement is also such that the shafts are rotated alternately so that one group of mechanisms are at rest while the other group is in operation.

Both the lining material and the cover material are adapted to be at rest when the operations are performed upon it and consequently the moving mechanism for the cover strip, or the carrier chain, and the moving mechanism for the lining material are actuated by the common driving shaft 152. The remaining mechanisms which comprise the notching mechanism, the lining blanking mechanism and the severing mechanism are controlled by the other drive shaft 72 and are adapted to be operated when the feeding mechanisms, and, consequently, the cover and lining materials, are at rest.

The severed blanks of lining material illustrated in Fig. 22 on which the lining blanks 12 have been cemented are moved by the carrier chains into position between the folding elements as illustrated in Fig. 2.

When the folding elements are set in operation the presser head 20 is moved downwardly and serves to strip the lining blanks from the chain grippers, the presser head descending below the level of the grippers and thus pulling the blank out of the frictional restraint of the grippers. The various folding operations which have previously been described briefly are then carried out.

The folding elements are actuated by an independent electric motor 26, or other suitable driving means, which is connected through suitable power translating devices not necessarily shown with a pulley 458. Said pulley is adapted to drive a gear 460 which is in constant mesh with a large gear 462, and said latter gear is connected through suitable clutch mechanism with an operating cam 464 through which the various elements of the folding mechanism are operated in timed sequence.

The folding mechanism is operated in timed sequence with the other elements of the machine and is adapted to be controlled through the clutch mechanism connecting said gear 462 with the cam member 464. Said clutch mechanism may be of any suitable construction and may comprise a notched hub 466 which is fixed to and rotatable with the gear 462. A second hub 468 is fixed for rotation with said cam member 464. A pin 470 is slidable in said hub 468 and engages one of the notches in the hub 466 when released by the operating lever 472. Said operating lever is arranged, when actuated and thereafter immediately released, to cause said pin 470 to establish driving connection between the two members of the clutch and, when the clutch has made a complete revolution to withdraw said pin from driving engagement thereby to effect a complete cycle of operation of the folding elements and cause the elements to remain stationary momentarily with the presser head raised above the material supporting table. The construction of this type of clutch mechanism is too well known to require further description.

The clutch mechanism may be controlled by one of said shafts 72 or 152 and preferably is controlled by the upper shaft 72. To this end said upper shaft is extended beneath the bed 24 of the folding mechanism and a cam member 474 is fixed to said extended end. Said clutch control lever 472 is pivoted on a pin 476 intermediate its ends and the free end of said lever is formed with a projection 478 which is adapted to ride upon said cam 474. A retractile spring 480 may serve to maintain said lever in engagement with said cam. The disposition of said cam 474 and lever 472 is such that said cam operates to actuate the lever and subsequently release it just prior to the stopping of rotation of the shaft 72. This arrangement permits sufficient time for the presser head to be lowered into contact with a cover blank disposed beneath it and to effect the folding operation while the notching and severing mechanisms are performing their respective operations on the cover and lining materials, and to come to rest with the presser head in elevated position before the cover and lining materials are again fed forwardly.

Means are provided to remove or kick-out each completed or folded book cover from between the folded elements before the next cover blank is moved therein; and said means is associated with the presser head and is illustrated in Figs. 1ª and 25 et seq. The presser head 20 is slidable vertically between fixed arms 482 which extend over the bed 24 of the folding mechanism. Forming plates 484 are supported by said presser head 20 in spaced relation therebelow. Said forming plates are disposed immediately above a thin presser plate 486 which is fixed to said head and is adapted to bear upon the cover blank, when the presser head is moved downwardly to clamp the blank upon the table 18 during the folding operation.

Said forming plates are expanded to define the line of fold and are subsequently contracted to withdraw them from under the folded edge by means including the reciprocable cam 488, which rod is reciprocated in one direction by the rod 490 and in the other direction by the rod 492 and the pivoted arm 494. Said rod 492 is reciprocated to reciprocate the pressure head vertically by means including the cam block 496. Said rods 490 and 492 are reciprocated in suitably timed relation with each other by engagement with the walls of cam slots formed in the transversely and longitudinally reciprocable cam block 498, which block is actuated by the aforementioned cam wheel 464. The kick-out mechanism is actuated by said cam block 498.

The kick-out mechanism includes a shaft 500 which is extended through the lower middle portion of the pressure head above the middle of the presser plate 486 and is journalled in frame-members of the presser head. A pair of kick-out rolls 502 are fixed to said shaft and are disposed thereon immediately above the middle of the presser-plate 486 and over slots 504 therein. The diameter of said rolls is such that, when rotated, they extend through said slots and bear against the inner face of a folded book cover which is disposed therebeneath and on the spring-supported table 18. Said rolls are provided with mutilated or flat faces 506 and the rolls are normally restrained in such positions that the flat faces are free from contact with the cover or, as illustrated in Fig. 28, are above the top of the presser-plate. When actuated, the rolls are adapted to be rotated rapidly into frictional engagement with the folded cover, as illustrated in Fig. 30, to move it out from between the folding elements and onto and over the guide plate 508. Said rolls are adapted to make one complete revolution in kicking out the cover and consequently return automatically to the normal position illustrated in Fig. 28. The spring-supported table 18 is provided with a roll 510 which is journalled on the under side thereof and extends through a slot in said table about in line with the upper face thereof and beneath said kick-out rolls. Said roll 510 is adapted to receive the driving pressure of said kick-out rolls on the folded cover.

The driving mechanism for said kick-out rolls includes a gear 512, which gear is in mesh with the gear 514 of an overrunning or one-way clutch mechanism. Said clutch mechanism includes a hub 516 which is disposed within said gear 514 and forms a rotatable support therefor and is rotatably supported on a stud screw 518. A gear 520 of the same pitch diameter as said clutch gear 514 is disposed beside said latter gear and is fixed to said hub 516, whereby to rotate it. The inner face of said gear 514 is formed with angularly-inclined teeth 522 which are adapted to be engaged by spring-pressed pawls 524 carried by the hub. The arrangement is such that the hub can rotate in one direction and drive the gear 514 and consequently the kick-out rolls, and rotate in the opposite direction without rotating said rolls. Said rolls are held yieldingly in their normal and inoperated position, as shown in Fig. 28, by a spring 526, see Fig. 30, which bears against the hubs of said rolls and preferably against flat faces 528 thereof, which faces are parallel to the flat faces of said rolls.

Said clutch-driving gear 520 is driven by superimposed idler gears 530 and 532, which latter gear is in mesh with a rack 534, which is supported horizontally for rectilinear movement in the presser-head. One end of said rack is extended outwardly beyond said presser head and is provided with a pin 536 which operates in a slot 538 formed in the forward end of a lever 540. Said lever is pivoted at 542 to one of the supporting arms 482 for the guide-ways of the presser-head for reciprocatory movement in a horizontal plane. The rear end of said lever is disposed between spaced cam-rollers 546 and 548 of the cam-block 498 and is adapted to be engaged alternately and reciprocated by said rollers. Said lever is provided with a striker-plate 550 which can be located on said lever in various positions by means of a slot 552 in said plate and a clamping bolt 554. Said plate has an inclined face 556 which is adapted to be engaged by said roll 546. By varying the position of said striker-plate on said lever, the timing of the beginning of the kick-out operation can be accurately adjusted.

An adjustable stop-member 558 is carried by said lever adjacent its connection with said rack 534, whereby to limit the throw of said lever due to its momentum and that of the mechanism associated therewith, whereby to prevent the kick-out rolls from making more than one complete revolution. The arrangement of the gears connecting the rack with the rolls is suitably proportioned to the throw of said lever so that a complete movement of the lever in one direction serves to rotate the rolls through one complete revolution. The return movement of said lever is effected without rotation of said rolls by the over-running action of the clutch and the holding action of the spring 526.

The throw of the forward end of the lever is large compared with that of the rear end, so that the kick-out rolls are forcibly and rapidly rotated and the folded covers are thereby suddenly and forcibly kicked out from position between the folding elements.

The connection between said rack 534 and lever 540 is such that the rack may move vertically, as the presser-head is correspondingly moved, while maintaining the aforesaid connection operative, the pin 536 being sufficiently long to permit such movement without being withdrawn from the slot 538 in said lever.

The kick-out mechanism is so timed that the rolls are rotated just about as the presser-head rises away from the table so that the folded cover lies free on the table.

The structure may be otherwise arranged without departing from the spirit of the invention.

I claim:

1. A book-cover folding machine comprising the combination of concurrently-operable folding elements arranged to fold over all sides of cover blanks at one operation, and means to feed separate blanks for folding in successive order into operative position between said concurrently-operable folding elements.

2. A book-cover folding machine comprising the combination of folding elements arranged to fold over all sides of cover blanks at one operation and including a reciprocable presser head, means to feed separate blanks for folding in successive order into position beneath said presser head with the sides of the blanks extended beyond the side of the presser head, and timing means connected with both said folding elements and said blank feeding means arranged to effect the operation of said feeding means when said presser head is in retracted position.

3. A book-cover folding machine comprising the combination of folding elements arranged to fold over the edges of the covers, means to feed separate cover blanks for folding in successive order in operative position with said folding elements, and means to operate both said folding elements and feeding means intermittently and alternately.

4. A book-cover folding machine comprising the combination of feeding means for cover blanks to be folded including blank-gripping means, and folding elements arranged to receive the separate blanks from the feeding means and fold over the edges of the blanks, at least one of said folding elements also constituting means to strip the blanks from the gripping means.

5. A book-cover folding machine comprising the combination of feeding means for cover blanks to be folded including a plurality of movable blank-gripping elements arranged to engage the side margins only of the blanks, and folding elements disposed adjacent the path of movement of said gripping elements and arranged to fold over the edges of the blanks, one of said folding elements also constituting means to strip the blanks from the gripping means.

6. A book-cover folding machine comprising the combination of feeding means for cover blanks to be folded including a plurality of movable blank-gripping elements arranged to engage the side margins only of the blanks, folding elements disposed adjacent the path of movement of said gripping elements and arranged to fold over the edges of the cover blanks, some of which also constitute means to strip the blanks from the gripping means, and means to operate said feeding means and folding elements intermittently.

7. A book-cover folding machine comprising the combination of feeding means for cover blanks including a carrier having a plurality of blank-gripping elements, and folding elements disposed adjacent and at one side of and in horizontal line with the path of movement of said blank-gripping elements and in position to receive the blanks and arranged to fold over the edges of the cover blanks, one of said folding elements also constituting means to effect the release of the blanks from said blank-gripping elements.

8. A book-cover folding machine comprising the combination of feeding means for cover blanks including a carrier-chain having a plurality of blank-gripping elements spaced along the length of the chain and adapted to engage the sides only of the blanks, and folding elements disposed beside said chain in position to receive the blanks, and arranged to fold over the edges of the blanks including means to remove the blanks from the engagement of said gripping elements.

9. A book-cover folding machine comprising the combination of feeding means for cover blanks including a carrier-chain having a plurality of spaced blank-gripping elements, folding elements disposed beside said carrier-chain in position to receive the blanks and fold over the edges thereof including means to remove the blanks from the engagement of said gripping elements, and intermittent means to operate said carrier-chain to advance said blanks to a position between said folding elements and arrest the blanks in such position.

10. A folding machine comprising the combination of folding elements, blank-conveyors disposed on opposite sides of said folding elements having means to present separate blanks in successive order in operative position with said folding elements, and means to operate said folding elements and conveyors intermittently.

11. A folding machine comprising the combination of folding elements, blank-conveyors including looped blank-engaging members disposed on opposite sides of said folding elements having means to support blanks between them and to present separate blanks in successive order to the action of said folding elements, and means to operate said looped members and folding elements intermittently.

12. A folding machine comprising the combination of folding elements, blank-conveyors including travelling-chains disposed on opposite sides of said folding elements and arranged to engage opposite margins of and transport separate blanks to be folded in successive order into folding position between said folding elements, and means to move said chains simultaneously with each other in the same direction.

13. A folding machine comprising the combination of folding elements, blank-conveyors including travelling-chains disposed on opposite sides of said folding elements and arranged to transport separate blanks to be folded in successive order into folding position between said folding elements, and means to move said chains and operate said folding elements intermittently.

14. A folding machine comprising the combination of folding elements, means to feed separate blanks of material to be folded in successive order into operative position with said folding means, and means to operate said feeding means and folding elements in timed sequence.

15. A folding machine comprising the combination of folding elements, means to feed separate blanks of material to be folded in successive order into operative position between said folding means, means to present blank-forming material to said feeding means, and means to operate said feeding means and folding elements in timed sequence.

16. A book-cover folding machine comprising the combination of folding elements, means to feed cover material to be folded to the action of said folding elements including a plurality of traveling material-grippers arranged one behind the other in the direction of movement of the material, means to present material in position to be engaged by said grippers, and means to operate said grippers to grip the material, some of said folding elements constituting means to engage the material and pull it out of the engagement of said grippers.

17. A book-cover folding machine comprising the combination of folding elements, means to feed cover material to be folded to the action of said folding elements including a plurality of normally closed travelling material-grippers, means to present material in position to be engaged by said grippers, and means to open said grippers to receive the material and subsequently to effect the closing of said grippers on the material, some of said folding elements constituting means to engage the material and pull it out of the engagement of the closed grippers.

18. A book-cover folding machine comprising the combination of folding elements, means to convey cover material to be folded to said folding means including a conveyor-chain disposed in a horizontal loop at one side of said folding elements, and a plate disposed immediately beneath and in supporting relation with said chain and on which said chain is movable, said plate having grooves therein in which the passes of said chain are received, at least one of said grooves having an upstanding rib engageable with the front face of said chain to prevent lateral movement thereof so that the material can be delivered to said folding elements at one unvariable position with respect thereto.

19. A book-cover folding machine comprising the combination of folding elements, means to convey cover material to be folded into operative position between said folding means including a conveyor-chain disposed in a horizontal loop at one side of said folding elements, and means to restrain at least one pass of said chain from lateral movement so that the cover material can be delivered to said folding elements in one unvariable position with respect thereto.

20. A book-cover folding machine comprising the combination of folding elements, means to convey cover material to be folded into operative position between said folding means including a conveyor-chain disposed in a horizontal loop at one side of said folding elements, and means to restrain at least one pass of said chain from both horizontal and vertical movements so that the material can be delivered to said folding elements in one unvariable position with respect thereto.

21. A book-cover folding machine comprising the combination of folding elements, means to convey cover material to be folded to said folding elements including an endless chain, material-grippers carried by and disposed along the length of said chain, said grippers including depressible arms, and means located at the forward end of said chain to operate said grippers including means to depress said arms, said folding elements being located at the rear end of said chain and some of them constituting means to pull the material out of said grippers.

22. A book-cover folding machine comprising the combination of folding elements, means to convey cover material to be folded to said folding elements including an endless chain normally closed, material-grippers carried by and disposed along the length of said chain, said grippers including depressible arms, and means to operate said grippers including a cam plate disposed in the path of movement of said arms at the forward end of said chain and having a cam face disposed in position to be engaged by said arms as said chain passes by said plate, whereby to depress said arms and open said grippers to admit material thereto, said folding element being located at the rear end of said chain and some of them constituting means to pull the material out of said normally closed grippers.

23. A book-cover folding mechanism comprising the combination of folding elements, means to convey cover material to be folded to said folding elements including an endless conveyor element having a plurality of normally closed material-gripping elements disposed along the length of said conveyor-element, and means located at the forward end of said chain to open said gripping elements so that they can engage the material and also subsequently to effect the closing of said gripping elements upon the material, said folding elements being located at the rear end of said chain and some of them constituting means to pull the material out of said normally closed gripping elements.

24. A book-cover folding machine comprising the combination of folding elements and means to convey cover material to be folded to the action of said folding elements including conveying elements which are movable into any one of a plurality of positions with respect to said folding elements, whereby to adjust said conveying means to the dimensions of the material to be folded.

25. A book-cover folding machine comprising the combination of folding elements, means to convey cover material to the action of said folding elements, and means to position said conveying means in any one of a plurality of positions which are laterally disposed with respect to said folding elements, whereby to condition said conveying means to act on materials having differing dimensions.

26. A book-cover folding machine comprising the combination of folding elements, means to convey cover material to the action of said folding elements, means to vary the lateral position of said conveying means with respect to said folding elements, whereby to condition said conveying means to act on materials having differing dimensions and means to operate said conveying means in any one of the lateral positions it may occupy.

27. A book-cover folding machine comprising the combination of folding elements, means to convey cover material to the action of said folding elements including an endless conveyor loop disposed at one side of said folding elements, means to vary the sidewise position of said loop with respect to said folding elements, and means to operate said loop in any position in which it may be placed.

28. A book-cover folding machine comprising the combination of folding elements, means to convey cover material to the action of said folding elements including endless conveyor loops disposed on opposite sides of said folding elements, means to vary the sidewise positions of said loops with respect to said folding elements, and means to operate said loops in any position in which it may be placed.

29. A book-cover folding machine comprising the combination of folding elements, means to convey cover material to the action of said folding elements including a pair of sprockets disposed at one side of the horizontal line of the folding elements, an endless chain passed about said sprockets and provided with means to grip the material releasingly, means to adjust said sprockets toward and away from the horizontal line of said folding elements, and means to drive said sprockets in any of the positions in which they may be set.

30. A book-cover folding machine comprising the combination of folding elements, means to convey cover material to the action of said folding elements including a pair of sprockets disposed at one side of the horizontal line of the folding elements, an endless chain passed about said sprockets and provided with means to grip the material releasingly, carriers on which said sprockets are mounted rotatably, cross-members on which said carriers are movable, whereby to adjust said chain toward and away from the horizontal line of said folding elements, and means to drive said sprockets in any position in which they may be set.

31. A folding machine comprising the combination of folding elements, means to convey material to the action of said folding elements including a pair of sprockets disposed at one side of the horizontal line of the folding elements, an endless chain passed about said sprockets and provided with means to grip the material releasingly, carriers on which said sprockets are mounted rotatably, cross-members on which said carriers are movable, whereby to adjust said chain toward and away from the horizontal line of said folding elements, and means to drive said sprockets in any position in which they may be set including a driving shaft disposed adjacent one of said sprockets, and intermeshing gearing connecting said sprocket and shaft, said gearing having a sliding driving connection with said shaft.

32. A book-cover folding machine comprising the combination of folding elements, means to move cover material in a step by step manner toward said folding elements, and means to vary the extents of movement of said steps.

33. A book-cover folding machine comprising the combination of folding elements, means to move cover material intermittently toward said folding elements, and means to govern the length of travel of the material in such intermittent movement.

34. A book-cover folding machine comprising the combination of folding elements, means to feed cover material toward the folding elements in successive steps, and means to govern the length of said steps.

35. A book-cover folding machine comprising the combination of folding elements operable in a fixed location and means to convey cover material to said folding elements including means for engaging materials having differing linear dimensions and for conveying the materials to the action of said folding elements regardless of differences in dimensions of the materials.

36. A book-cover folding machine comprising the combination of folding elements operable in a fixed location, and means to convey cover material in a step by step manner to said folding elements, said conveying means having means to vary the length of said steps and also to vary its position with respect to said fixedly located folding elements, and to deliver the material, in whatever position it may occupy, and regardless of the length of said steps, to the action of said fixedly-located folding elements.

37. A book-cover folding machine comprising the combination of folding elements operable in a fixed location, a conveying device for the cover material disposed at one side of the horizontal line of said folding elements, means to operate said device in a step by step manner including means to vary the extent of travel of said device at each step, and means to vary the position of said device with respect to the horizontal line of said folding elements, said operating means arranged to operate said device in the aforesaid manner in any position which said device may occupy, whereby to condition said device to convey to said folding elements materials having differing dimensions.

38. A book-cover folding machine comprising the combination of folding elements, means to sever blanks from a long strip of cover material, and means engaging the material to feed the material to said severing means, said means also maintaining its engagement with the separate blanks and operable to feed the blanks into operative position with said folding elements.

39. A book-cover folding machine comprising the combination of cover folding elements, means to sever blanks from a long strip of material, and a common means to feed the material to said severing means and the separate blanks into operative position with said folding elements.

40. A book-cover folding machine comprising the combination of folding elements, a strip-severing device disposed in front of said folding elements, and means engageable with a strip of cover material to feed it to said severing device and also to maintain its engagement with the severed sections of the strip and to feed the severed sections in successive order into operative position with said folding elements.

41. A book-cover folding machine comprising the combination of folding elements, a strip-severing device disposed in front of said folding elements, means arranged to feed a strip of cover material toward said severing device and toward said folding elements, a strip-gripping means carried by said feeding means arranged to grip the material during the action of said severing device and to maintain the grip on the severed sections during their passage to said folding elements, said folding elements arranged to remove the severed sections from the grip of said gripping means.

42. A book-cover folding machine comprising the combination of folding elements, a severing device disposed in front of said folding elements, and means to feed a strip of cover material to said severing device and the severed sections of material to said folding elements comprising an endless conveyor loop extended from a position in front of said severing device to said folding elements and having material-gripping means arranged to maintain a grip on the material and also the sections severed therefrom, said folding elements arranged to remove the severed sections from the grip of said gripping means.

43. A folding machine comprising the combination of folding elements, a severing device disposed in front of said folding elements, and means to feed a strip of material to said severing device and the severed sections of material to said folding elements comprising an endless chain disposed beside said severing device and said folding elements and extended forwardly of said severing device, said chain having a plurality of material gripping means, and opening and closing means for said gripping means whereby to cause said gripping means to grip the material, said folding elements arranged to pull the severed sections out of the grip of said gripping means.

44. A book-cover folding machine comprising the combination of folding elements, a severing device disposed in front of said folding elements, means to move cover material to said severing device and thence to said folding elements, said severing device being movable toward and away from said folding elements into any one of several positions along the line of material movement, and means to operate said severing device in any position in which it may be set.

45. A folding machine comprising the combination of folding elements, a severing device disposed in front of said folding elements, a support on which said severing device is adjustable toward and away from said folding elements, and means to move material to said severing device and the severed materials thence by said same means to said folding elements.

46. A folding machine comprising the combination of folding elements, a severing device disposed in front of said folding elements, a step-by-step mechanism to convey material to said severing device and the severed material thence to said folding elements, and means to vary the length of the severed sections of material including means to vary the position of said severing device with respect to said folding elements, and means to vary the feed of said step-by-step mechanism.

47. A folding machine comprising the combination of folding elements, a severing device disposed in front of said folding elements, means to feed material to said severing device and the severed material thence to said folding elements, and means to vary the length of the severed sections including means to vary the feed of said feeding means.

48. A folding machine comprising the combination of folding elements, a severing device disposed in front of said folding elements, means to feed material to said severing device and thence to said folding elements, and means to vary the length of the severed sections including means to vary the feed of said feeding means, and means to vary the position of said severing device with respect to said folding elements.

49. A cover folding machine comprising the combination of folding elements, means to feed a strip of cover material toward said folding elements, means to notch the margin of the strip, and means to sever the strip into blanks at the notches, some of said folding elements constituting means to fold the blanks at the corners formed by the notches.

50. In a book-cover folding machine, folding elements, a notching device disposed in front of said folding elements and arranged to form spaced notches in the margin of a strip of cover material, means to feed cover material to said notching device and thence to said folding elements, means to vary the spacing of the notches in the material and means to sever the material into cover blanks at the notches, some of said folding elements constituting means to fold over the material of the cover blanks at the notches to form round corners.

51. In a book-cover folding machine, folding elements, a notching device disposed in front of said folding elements and arranged to form spaced notches in the margin of a strip of cover material, means to feed cover material to said notching device and thence to said folding elements, and means to vary the spacing of the notches in the material, comprising means to operate said feeding means intermittently, means to vary the amount of material fed during each operation, and means to operate said notching device during the stationary periods of the material.

52. In a folding machine adapted to operate on a long strip of material, a margin-notching device, a severing device, and a folding device, said devices disposed in spaced relation with each other in the aforesaid order, means to move material in succession to said devices, and means to vary the relative spacing between said devices.

53. In a folding machine adapted to operate on a long strip of material, a margin-notching device, a severing device and a folding device, said devices disposed in spaced relation with each other in the aforesaid order, means to move material in succession to said devices, step-by-step means to move material intermittently in succession to said devices including means to vary the amount of material moved at each step, and means to vary the relative spacing between said devices.

54. A book-cover folding machine comprising the combination of means to feed a strip of cover material, means to apply lining blanks in spaced order to the cover material, means to sever the cover material into sections each containing a pair of lining blanks, and folding elements to receive and fold margins of the severed sections over the lining blanks.

55. A book-cover folding machine comprising the combination of means to feed strips of cover and lining materials, means to form blanks of the lining material and to apply the blanks in spaced order to the cover material, means to sever the lined cover material into sections containing pairs of lining blanks, and means to fold the margins of the cover material in the sections over the margins of the lining blanks.

56. A folding machine having the combination of means to support a strip of cover material, means to support a strip of lining material above the cover strip, means to cut blanks out of the lining strip while preserving the continuity of the strip to move the blanks downwardly onto the cover strip, and means including folding elements disposed in position to receive and operate upon the lined cover strip.

57. A folding machine having the combination of means to support two strips of material in vertically spaced relation, means to apply paste to the upper face of said lower strip, a female die disposed between the strips, a male die disposed above the upper strip and arranged to cut blanks out of the upper strip and move the blanks through said female die and deposit them upon the pasted face of said lower strip, and folding elements operable upon the lower strip and the blanks thereon.

58. A folding machine having the combination of means to support a strip of cover material, means to support a strip of lining material in spaced position above said cover strip, means to move said strips intermittently transversely of each other, means operable during the rest periods of said strips to cut out blanks from the lining strip while maintaining the continuity thereof and to deposit the blanks onto the cover strip, and folding elements operable on the lined cover strip.

59. A folding machine having the combination of means to feed a strip of cover material, means to feed a strip of lining material transversely across said cover strip, a blanking mechanism including a female die disposed between said strips and a cooperating male die disposed above said lining strip, the arrangement of said dies being such as to cut blanks from the lining strip and to move the blanks through the female die and deposit them upon the cover strip, and folding elements operable on the lined cover strip.

60. A folding machine having the combination of means to feed a strip of cover material, means to feed a strip of lining material transversely across said cover strip, a blanking mechanism including a female die disposed between said strips and a cooperating male die disposed above said lining strip, the arrangement of said dies being such as to cut blanks from the lining strip and to move the blanks through the female die and press them upon the cover strip, means to operate said feeding means and blanking mechanism in timed sequence, and folding elements operable on the lined cover strip.

61. A folding machine having the combination of means to feed strips of lining and cover materials, means to form blanks from the lining strip and to deposit the blanks onto the cover strip while maintaining the continuity of the lining strip, means to sever sections each containing a pair of blanks from the cover strip, and folding elements operable on the severed sections.

62. The combination of means to feed strips of lining and cover materials, means to apply a paste to one face of the cover strip, means to form blanks from the lining strip while preserving the continuity of the lining strip and, as a succeeding part of the blanking operation, to deposit the blanks in spaced relation onto the pasted face of the cover strip, means to sever sections each containing a lining blank from the cover strip, and means to fold the sections.

63. A folding machine comprising the combination of means to feed a strip of cover material, means to feed a strip of lining material above the cover material, means to apply a paste to the upper face of the cover material, means to form blanks from the lining material while preserving the continuity of the lining strip and to move the blanks downwardly and press them upon the pasted face of the cover material, means to sever sections each containing a lining blank from the cover material, and means to fold the sections.

64. A folding machine having the combination of means to apply a paste to one face of a strip of material, means to form and apply lining blanks to the pasted material, means to sever sections from the lined material, and means to fold the sections, all of said means having relatively adjustable elements, whereby to condition the machine for operation upon various dimensions of material.

65. A folding machine comprising the combination of means to feed a strip of cover material, means to apply paste to one face of the strip, means to notch the margin of the cover strip, means to feed a strip of lining material above the cover strip, means to cut blanks from the lining strip while preserving the continuity of the strips and deposit the blanks upon the pasted face of the cover strip between the notches therein, means to sever the lined cover strip into sections at the notches, and means to fold the sections.

66. A folding machine comprising the combination of means to feed a strip of cover material, means to apply paste to one face of the strip, means to notch the margin of the cover strip, means to feed a strip of lining material above the cover strip, means to cut blanks from the lining strip and deposit them upon the pasted face of the cover strip between the notches therein, means to sever the lined cover strip into sections at the notches, means to fold the sections, and means to remove the folded sections from the folding means.

67. A folding machine comprising the combination of folding elements, means to feed a strip of material in the line of said folding elements, means to form notches in the margin of the strip, and means admitting of the movement of the notching means toward and away from the line of said folding elements.

68. A folding machine comprising the combination of a frame, folding elements disposed at one end and pasting mechanism disposed at the other end of said frame, means to move a strip of cover material in operative relation with said pasting means and thence toward said folding elements, means disposed at the middle of said frame arranged to feed a strip of lining material above and transversely of said cover strip, blanking mechanism disposed mainly above said lining strip arranged to form blanks from said lining strip while preserving the continuity of the lining strip and deposit the blanks upon the pasted cover strip, severing mechanism disposed between said blanking mechanism and folding elements arranged to sever the cover strip into sections each containing two lining blanks prior to the presentation of the material to the action of the folding elements, and means to operate the aforesaid devices in timed order.

69. A folding machine comprising the combination of a frame, folding elements disposed at one end and pasting mechanism disposed at the other end of said frame, means to move a strip of cover material in operative relation with said pasting means and thence toward said folding elements, means disposed at the middle of said frame arranged to feed a strip of lining material above and transversely of said cover strip, blanking mechanism disposed mainly above said lining strip arranged to form blanks from said lining strip and deposit the blanks upon the pasted cover strip, severing mechanism disposed between said blanking mechanism and folding elements arranged to sever the cover strip into sections between the lining blanks prior to the presentation of the material to the action of the folding elements, said severing mechanism having provision for adjustmnt along the length of said frame, and means to operate the aforesaid elements in timed order.

70. A folding machine comprising the combination of a frame, folding elements disposed at one end and pasting mechanism disposed at the other end of said frame, means to feed a strip of cover material through said pasting mechanism and thence toward said folding elements, a notching mechanism disposed on said frame adjacent said pasting mechanism and having means by which it can be moved along said frame, said notching mechanism having means arranged to form spaced notches in the margin of the cover material, means disposed at the middle of said frame arranged to draw a strip of lining material above and transversely across said cover strip, blanking mechanism disposed mainly above the lining strip arranged to form blanks from said lining strip and deposit the blanks upon the pasted cover strip between the notches, severing mechanism disposed between said blanking mechanism and folding elements arranged to sever the cover strip into sections at the notches and means including a timing shaft extended between the aforesaid mechanisms to operate them in timed order.

71. A folding machine comprising the combination of a frame, folding elements disposed at one end and pasting mechanism disposed at the other end of said frame, means to feed a strip of cover material through said pasting mechanism and thence toward said folding elements, a notching mechanism disposed on said frame adjacent said pasting mechanism and longitudinally adjustable along said frame, said notching mechanism having means arranged to form spaced notches in the margin of the cover material, means disposed at the middle of said frame arranged to feed a strip of lining material above and transversely of said cover strip, blanking mechanism disposed mainly above the lining strip arranged to form blanks from said lining strip and deposit the blanks upon the pasted cover strip between the notches, severing mechanism disposed between said blanking mechanism and folding elements arranged to sever the cover strip into sections at the notches, a pair of timing shafts extended between the aforesaid mechanisms, means connecting the notching, blanking and severing mechanisms with one shaft for conjoint control, means connecting the feeding mechanisms for the lining and cover strip with the other shaft for conjoint control, and means to operate said shafts alternately.

72. A folding machine having intermittently operable folding elements, and intermittently operable means providing an endless driving face movable in one direction to engage and to remove the folded material from position between the folding elements.

73. A folding machine having reciprocable folding elements, and an intermittently rotated roll disposed between said elements in position to engage the folded material and move it from position between said folding elements.

74. A folding machine having folding elements, and an intermittently rotated roll disposed between said elements above the folded material and in position to engage the folded material and move it from position between said folding elements.

75. A folding machine having folding elements, and means to remove the folded material from position between said folding elements including a kick-out roll maintained normally free from engagement with the material, and means to move said roll into engagement with the material.

76. A folding machine having folding elements, and means to remove the folded material from position between said folding elements including a kick-out roll maintained normally free from engagement with the material, and means to move said roll into engagement with the material including means to rotate said roll.

77. A folding machine having folding elements, and means to remove the folded material from position between said folding elements including a kick-out roll engageable with the folded material and means intermittently to rotate said roll approximately a complete revolution at each operation thereof.

78. A folding machine having folding elements, and means to remove the folded material from position between said folding elements including a kick-out roll engageable with the folded material, and reciprocable means to rotate said roll intermittently.

79. A folding machine having folding elements, and means to remove the folded material from position between said folding elements including a kick-out roll engageable with the folded material, reciprocable means to rotate said roll, and a one-way clutch mechanism interposed between said reciprocable means and roll.

80. A folding machine having folding elements, and means to remove the folded material from position between said folding elements including a kick-out roll engageable with the folded material, reciprocable means to rotate said roll, a one-way clutch mechanism interposed between said reciprocable means and roll, and yielding means to restrain said roll against over-rotation.

81. A folding machine having folding elements, and means to remove the folded material from position between said folding elements including a kick-out roll engageable with the folded material, means to rotate said roll intermittently including a reciprocable rack, and means including gearing and an over-running clutch mechanism connecting said rack and roll.

82. A folding machine having folding elements, and means to remove the folded material from position between said folding elements including a kick-out roll engageable with the folded material, means to rotate said roll intermittently including a reciprocable rack, an operating lever for said rack, and an extensible connection between said lever and rack.

83. A folding machine having folding elements, and means to remove the folded material from position between said folding elements including a kick-out roll engageable with the folded material, means to rotate said roll intermittently including a reciprocable rack, an operating lever for said rack, and a reciprocatory operating member for said lever having a lost-motion connection therewith.

84. A folding machine having folding elements including a vertically-reciprocable presser head, means to remove the folded material from position between said folding elements including a kick-out roll carried by said presser-head in position to engage the folded material, means to rotate said roll intermittently including a rack carried by said presser-head, means including gearing and a one-way clutch mechanism operatively connecting said rack and roll, an operating lever for said rack having a fixed pivotal support, and an extensible connection between said rack and lever.

85. A folding machine having folding elements including a vertically-reciprocable presser-head, means to remove the folded material from position between said folding elements including a kick-out roll carried by said presser-head in position to engage the folded material, means to rotate said roll intermittently including a rack carried by said presser-head, means including gearing and a one-way clutch mechanism operatively connecting said rack and roll, an operating lever for said rack having a fixed pivotal support, a flexible connection between said rack and lever, and a reciprocable cam-member having a connection with said presser head for reciprocating it and also having an operating connection with said lever.

86. A folding machine having folding elements, and means to remove the folded material from position between said elements including a kick-out roll engageable with the folded material, and means to rotate said roll intermittently including a lever, reciprocatory means having a fixed extent of travel arranged to reciprocate said lever, and means independent of said reciprocatory means to limit the extent of travel of said lever.

87. A folding machine having folding elements, and means to remove the folded material from position between said elements including a kick-out roll engageable with the folded material, and means to rotate said roll intermittently including a lever having a cam-face, and a reciprocatory member having an abutment adapted to engage the cam-face of said lever.

88. A folding machine having folding elements, and means to remove the folded material from position between said elements including a kick-out roll having a mutilated material-engaging face, and means to rotate said roll.

89. A folding machine having folding elements, and means to remove the folded material from position between said elements including a kick-out roll having a material-engaging face provided with a flattened section which is disposed normally out of engagement with the material, and means to effect engagement of said roll with the material including means to rotate said roll.

90. A folding machine having folding elements including a vertically reciprocable presser-plate, and means to remove the folded material from position beneath said plate including a kick-out roll disposed to rotate with its periphery disposed beneath said presser-plate, said roll having a flattened peripheral section which is disposed normally above said presser-plate and means to rotate said roll throughout approximately a complete revolution at each operation thereof.

91. A folding machine having folding elements including a vertically reciprocable presser-plate, and means to remove the folded material from position beneath said plate including a kick-out roll disposed to rotate with its periphery disposed beneath said presser-plate, said roll having a flattened peripheral section which is disposed normally above said presser-plate, guiding means to hold said roll in the aforesaid relation, and means to rotate said roll through approximately a complete revolution at each operation thereof.

92. A folding machine having folding elements, and means to remove the folded material from position between said elements including a segmental kick-out roll disposed in position to be rotated into engagement with the material and disposed normally out of engagement therewith, and means to rotate said roll throughout approximately a complete revolution at each operation thereof.

93. A folding machine having folding elements including a presser-head disposed above the material, a kick-out roll disposed in position to engage the material, means to rotate said roll, and means to support the material yieldingly in contact with said roll during the rotation thereof.

94. A folding machine having folding elements including a presser-head disposed above the material, means to reciprocate said head, a kick-out roll operable on the folded material to remove it from position beneath said presser-head, and means to operate said roll during the upward movement of said presser-head.

95. The method of making lined book covers having folded side edges which consists in longitudinally feeding a long strip of cover material, severing the material transversely of its length to form cover blanks, and folding over the side edges of the blanks.

96. The method of making lined book covers having folded edges which consists in longitudinally feeding a long strip of cover material having an adhesive upper surface, longitudinally feeding a long strip of lining material into proximity with said cover strip, cutting blanks from said lining strip and distributing said blanks upon the adhesive face of said cover strip, severing the cover strip between certain of said blanks and folding over the sides of said severed sections of cover strip.

97. The method of making lined book covers having folded edges which consists in longitudinally feeding a long strip of cover material having an adhesive upper surface in successive measured steps, transversely feeding thereabove a long strip of lining material in successive measured steps, cutting said lining strip into blanks and depositing the blanks upon the adhesive surface of said lining material, cutting the lining material into sections between blanks, and folding over the edges of the sections.

98. A folding machine having means for feeding a cover strip, means for applying pairs of spaced liner blanks in spaced relation on said cover strip, means for severing said cover strip between each pair of blanks, and means for folding the edges of the severed cover strips.

99. A folding machine having means for feeding a cover strip, means for applying pairs of spaced liner blanks in spaced relation on said cover strip, means for severing said cover strip between each pair of blanks, and means for folding all edges of the severed cover-strip upon said liner blanks.

100. In a machine of the class described, the combination of means for feeding a cover strip, means for affixing pairs of spaced liner blanks in spaced relation on said cover strip, and means for severing said cover strip between each pair of liner blanks.

101. A book-cover folding machine having folding elements, means to pull a strip of cover toward said folding elements, means to pull a strip of lining material transversely across said cover strip, means to cut a lining blank out of said lining strip, entirely within all margins thereof and to deposit said blank upon said cover strip, and means to sever said cover strip into cover blanks between said lining blanks, said folding elements arranged to fold over the edges of said cover blanks upon the lining blanks.

102. A book-cover folding machine comprising means to feed a cover strip, means to place on the cover strip lining blanks which are inset from the edges of the cover strip, means to sever the cover strip between lining blanks to form cover blanks, the cover strip of which extends beyond the margins of the lining blanks, and means to fold the edges of the cover strips of the blanks over the edges of the lining blanks.

103. A book-cover folding machine having folding elements, means to feed cover strips toward said folding elements, means to form spaced notches in a margin of the cover sheet and means to sever the sheet into cover blanks at the notches, said folding elements including means to fold over the material at the notched margins of the cover blanks to form a folded corner thereof.

In testimony whereof, I have signed my name to this specification.

JOSEPH W. ANTHONY.